US011845435B2

(12) United States Patent
Yatagai et al.

(10) Patent No.: US 11,845,435 B2
(45) Date of Patent: Dec. 19, 2023

(54) DRIVING ASSISTANCE DEVICE

(71) Applicant: SUBARU CORPORATION, Tokyo (JP)

(72) Inventors: Takuro Yatagai, Tokyo (JP); Hikaru Kumagai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 326 days.

(21) Appl. No.: 17/222,648

(22) Filed: Apr. 5, 2021

(65) Prior Publication Data

US 2021/0339746 A1 Nov. 4, 2021

(30) Foreign Application Priority Data

May 1, 2020 (JP) ................................. 2020-081388

(51) Int. Cl.
| | |
|---|---|
| *B60W 30/10* | (2006.01) |
| *B60W 30/18* | (2012.01) |
| *B60W 10/18* | (2012.01) |
| *B60W 50/14* | (2020.01) |
| *B60W 10/04* | (2006.01) |

(52) U.S. Cl.
CPC ...... *B60W 30/18154* (2013.01); *B60W 10/04* (2013.01); *B60W 10/18* (2013.01); *B60W 30/10* (2013.01); *B60W 30/18109* (2013.01); *B60W 50/14* (2013.01); *B60W 2552/53* (2020.02)

(58) Field of Classification Search
CPC .......... B60W 30/18154; B60W 10/04; B60W 10/18; B60W 30/10; B60W 30/18109; B60W 50/14; B60W 2552/53
See application file for complete search history.

(56) References Cited

U.S. PATENT DOCUMENTS

| | | | | |
|---|---|---|---|---|
| 2019/0031174 A1* | 1/2019 | Adachi | ............... | B60W 30/181 |
| 2019/0389465 A1* | 12/2019 | Ogino | ............. | B60W 30/18009 |
| 2020/0285244 A1* | 9/2020 | Gier | ..................... | G05D 1/0246 |

FOREIGN PATENT DOCUMENTS

JP 2019-219986 A 12/2019

* cited by examiner

*Primary Examiner* — Truc M Do
(74) *Attorney, Agent, or Firm* — Rimon P.C.; Tomoki Tanida

(57) ABSTRACT

A driving assistance device includes a forward recognizer configured to recognize a forward situation of a vehicle, a brake controller configured to perform brake control, and a determiner configured to determine execution of the brake control and drive control based on target data obtained by the forward recognizer and/or from map information. The brake controller performs the brake control to stop the vehicle at a position before a stop line of a road surface, based on a recognition result from the forward recognizer. When the vehicle stops and the forward situation is determined to be safe the determiner slowly drives the vehicle to another position before a crossing road edge where the road on which the vehicle drives intersects with another road. When the vehicle is at the other position and the forward situation is determined to be safe, the determiner slowly drives the vehicle from the other position by a predetermined distance.

13 Claims, 7 Drawing Sheets

DRIVING ASSISTANCE DEVICE

CROSS-REFERENCE TO RELATED APPLICATIONS

The present application claims priority from Japanese Patent Application No. 2020-081388 filed on May 1, 2020, the entire contents of which are hereby incorporated by reference.

BACKGROUND

The present disclosure relates to a driving assistance device that performs vehicle control to assist the driving operation of a driver based on information data obtained using a camera or the like.

In recent years, for vehicles such as automobiles, various driving assistance devices have been proposed, each of which recognizes a preceding vehicle and various objects, and utilizes information on the recognized various objects as information for performing vehicle control to assist the driving operation of a driver based on information data related to the situation around (mainly, forward which is a traveling direction) the vehicle obtained using a camera (hereinafter referred to an in-vehicle camera device) mounted on the vehicle.

For example, the driving assistance device disclosed in Japanese Unexamined Patent Application Publication (JP-A) No. 2019-219986 checks the indication state of a traffic signal and the situation of a travel path and around the road upon entry of a vehicle into an intersection, and for example, even if indication of the traffic signal changes to a green light, performs drive control (starting to drive or maintaining stop before a stop line) of the vehicle according to the surrounding situation.

In addition, in a driving assistance device in the art, for example, after the vehicle is stopped before an intersection or a stop line, the situation around the vehicle is checked while the stop state being maintained or the vehicle being driven slowly, and unless other objects in addition to another vehicle, a pedestrian, and a bicycle are recognized, the surroundings are determined to be safe, and drive control is basically performed, such as starting to drive the vehicle from the stop state, continuing driving the vehicle slowly, and performing acceleration and deceleration control.

SUMMARY

An aspect of the disclosure provides a driving assistance device configured to perform vehicle control to assist a driving operation of a vehicle. The device includes a forward recognizer, a brake controller, and a determiner. The forward recognizer is configured to perform the recognition of at least a forward situation that is a situation forward of the vehicle in a traveling direction of a vehicle. The brake controller is configured to perform brake control of the vehicle. The determiner is configured to determine execution of the brake control and drive control of the vehicle on a basis of one or both of first target data and second target data. The first target data is obtained by the forward recognizer. The second target data is related to a forward situation of the vehicle and obtained from map information. The brake controller is configured to perform the brake control to stop the vehicle at a first position before a stop line provided on a road surface, on a basis of a result of the recognition of the forward situation by the forward recognizer. In a case where, when the vehicle stops at the first position before the stop line, the forward situation is determined, on a basis of the result of the recognition of the forward situation by the forward recognizer, to allow the vehicle to drive safely, the determiner is configured to determine to perform the drive control to slowly drive the vehicle forward to a vicinity of a second position before a road edge at which a first road crosses a second road on which the vehicle is driving. In a case where, when the vehicle is in the vicinity of the second position before the road edge, the forward situation is determined again, on a basis of the result of the recognition of the forward situation by the forward recognizer, to allow the vehicle to drive safely, the determiner is configured to determine to perform the drive control to slowly drive the vehicle forward from the second position before the road edge by a predetermined distance.

An aspect of the disclosure provides a driving assistance device configured to perform vehicle control to assist a driving operation of a vehicle by vehicle control. The device includes circuitry. The circuitry is configured to perform the recognition of at least a forward situation that is a situation forward of the vehicle in a traveling direction of the vehicle. The circuitry is configured to perform brake control of the vehicle. The circuitry is configured to determine execution of the brake control and drive control of the vehicle on a basis of one or both of first target data and second target data. The first target data is obtained by the circuitry. The second target data is related to the forward situation of the vehicle and obtained from map information. The circuitry is configured to perform the brake control to stop the vehicle at a first position before a stop line provided on a road surface, on a basis of a result of the recognition of the forward situation. In a case where, when the vehicle stops at the first position before the stop line, the forward situation is determined, on a basis of the result of the recognition of the forward situation, to allow the vehicle to drive safely, the circuitry is configured to determine to perform the drive control to slowly drive the vehicle forward to a vicinity of a second position before a road edge at which a first road crosses a second road on which the vehicle is driving. In a case where, when the vehicle is in the vicinity of the second position before the road edge, the forward situation is determined again, on a basis of the result of the recognition of the forward situation, to allow the vehicle to drive safely, the circuitry is configured to determine to perform the drive control to slowly drive the vehicle forward from the second position before the road edge by a predetermined distance.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
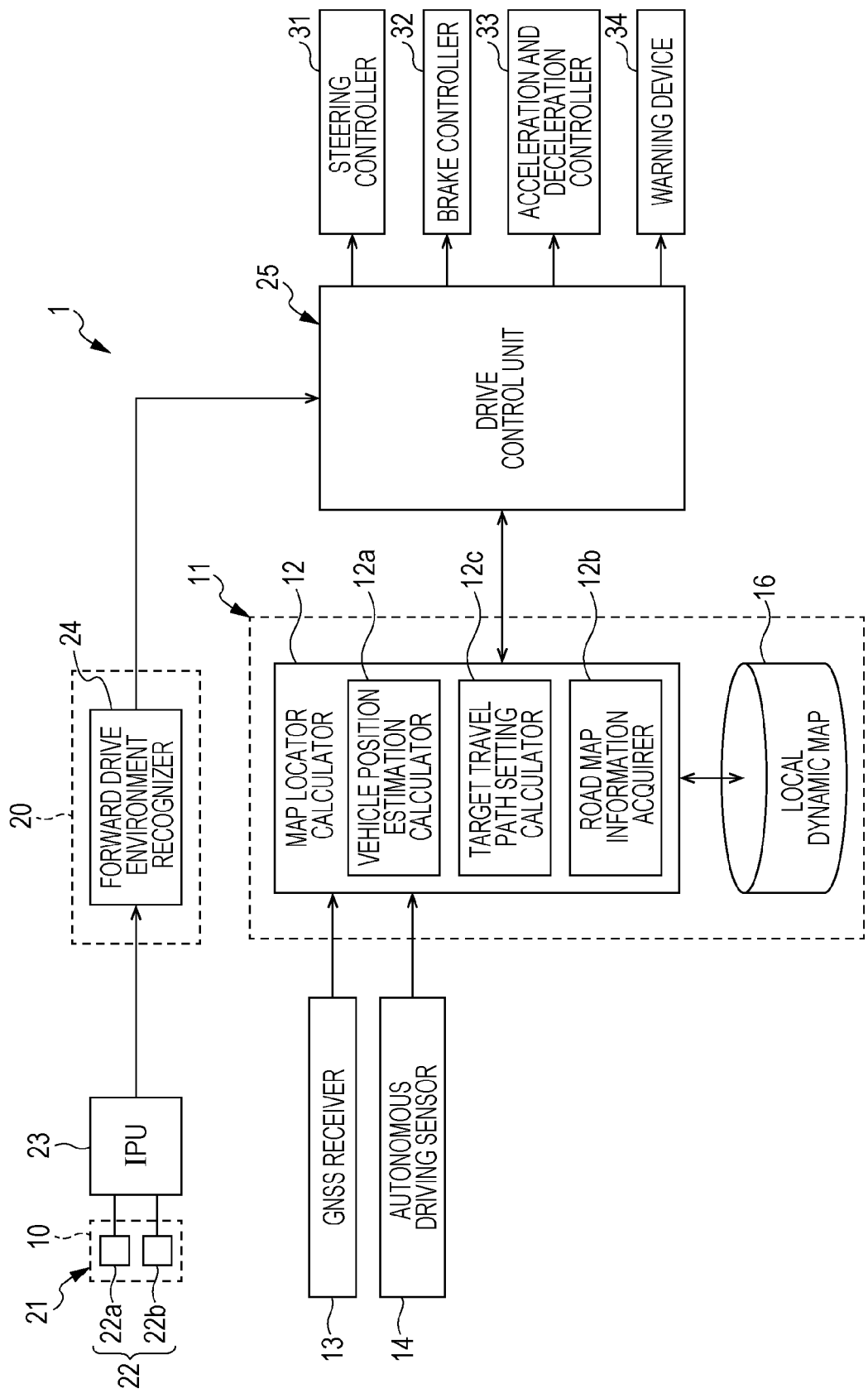
FIG. 1 is a block configuration diagram illustrating a schematic configuration of a driving assistance device according to an embodiment of the disclosure.

For example, when a vehicle is temporarily stopped before an intersection with poor visibility (for example, an intersection with a blind spot due to a wall or a fence of a building, tree plantation), or before a stop line in a traveling direction of the vehicle, the road situation (for example, other vehicles, a pedestrian, a bicycle, and other objects) of the crossing road cannot be easily visually recognized from a stop position, and recognition of the situation using an in-vehicle camera is often difficult.

At an intersection with relatively good visibility, when the vehicle is temporarily stopped due to a red traffic signal and the traffic signal forward of the vehicle changes from a red light to a green light, immediately after the change of the signal, it is often the case that other vehicles (including an emergency vehicle, for example) may still be driving on the road crossing the traveling road of the vehicle, or other vehicles still turning right or turning left from the crossing road to the traveling road of the vehicle may remain in the intersection to block the traveling road forward of the vehicle due to, for example, traffic jam on the traveling road of the vehicle, and in addition, pedestrians and/or bicycles may still be crossing a crosswalk immediately in front of the stop position of the vehicle.

However, in the driving assistance device in the art disclosed in JP-A No. 2019-219986, driving control in such situations is not considered, thus suppression of the occurrence of so-called encounter traffic accident has been insufficient.

It is desirable to provide a driving assistance device that contributes to suppression of the occurrence of so-called encounter traffic accident by a devised method for vehicle drive control after temporary stop of a vehicle before an intersection or before a stop line, for example.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A driving assistance device according to an embodiment of the disclosure is a device to be installed in a vehicle such as an automobile to assist driving of the vehicle. That is, the driving assistance device according to the embodiment recognizes a preceding vehicle and various objects based on, for example, target data related to the situation around (mainly, forward in a traveling direction of) the vehicle, obtained using an in-vehicle camera device and target data obtained from map information, then utilizes the recognized information as information for performing vehicle control to assist the driving operation of a driver who drives the vehicle.

In the driving assistance device according to the embodiment, the vehicle drive control is performed after temporary stop of a vehicle before an intersection or before a stop line in the traveling direction of the vehicle, for example.

First, the schematic configuration of the driving assistance device according to the embodiment of the disclosure will be described below with reference to the block configuration diagram of FIG. 1.

Note that basically, the configuration of a driving assistance device 1 according to the embodiment is substantially the same as the configuration of a driving assistance device in an embodiment in the art. Thus, in the following description of the configuration of the driving assistance device 1 according to the embodiment, only the primary configuration of the device will be briefly described, and a description of the detailed configuration will be omitted because the detailed configuration is the same as that of a driving assistance device in the art. Also, in FIG. 1, only the primary configuration of the driving assistance device according to the embodiment is illustrated, and illustration of a detailed configuration of other components is omitted.

Figure 2:
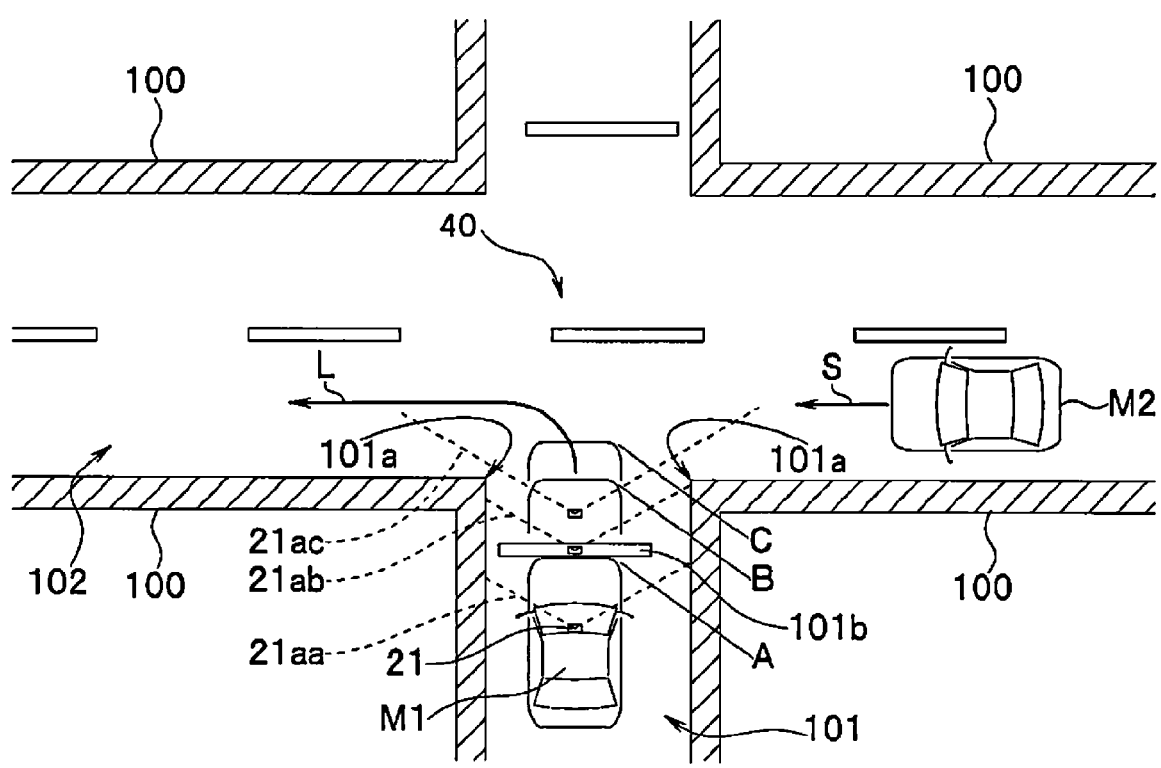
FIG. 2 is a conceptual diagram illustrating a situation for explaining the operation of a vehicle equipped with the driving assistance device according to the embodiment of the disclosure.

The driving assistance device 1 according to the embodiment is installed in a vehicle M1 (see FIG. 2). As illustrated in FIG. 1, the driving assistance device 1 has a locator unit 11 that detects the position of the vehicle, and an autonomous sensor unit 22 which is an autonomous detector including a stereo camera device 21 that recognizes the driving environment (forward) of the vehicle M1 in the traveling direction.

In the case where one of the locator unit 11 and the autonomous sensor unit 22 is in malfunction, a redundant system is configured, which temporarily continues the driving assistance by the other unit. In addition, the driving assistance device 1 constantly monitors whether the currently driving road keeps the same shape by the locator unit 11 and the autonomous sensor unit 22. When the same shape is kept, the driving assistance device 1 continues the driving assistance.

The locator unit 11 estimates the position (the vehicle position) of the vehicle M1 on a road map, and obtains road map information on an area forward of the vehicle position. Meanwhile, the stereo camera device 21 of the autonomous sensor unit 22 determines the road curvature at the center of a division line which divides the driving lane of the vehicle M1 into the right and the left, and detects a lateral position deviation of the vehicle M1 in a vehicle width direction relative to the center of the right and left division line.

Furthermore, the stereo camera device 21 recognizes a 3-D object, signal indication (lighting color), a road sign, and road marking such as a stop line. The 3-D object includes a mobile object (hereinafter simply referred to as a moving object) such as a preceding vehicle ahead of the vehicle M1, a pedestrian, a bicycle, or a motorcycle, which is crossing immediately in front of the vehicle M1.

The locator unit 11 has a map locator calculator 12, and a highly accurate road map database 16 serving as a storage unit. The map locator calculator 12, and a forward drive environment recognizer 24 and drive control unit 25 that are to be described later are configured of a well-known microcomputer and its peripheral devices, the microcomputer including a central processing unit (CPU), a random access memory (RAM), a read only memory (ROM), and a non-volatile memory.
In the ROM, the programs to be executed by the CPU and fixed data such as a data table are pre-stored.

The input side of the map locator calculator 12 is coupled to a global navigation satellite system (GNSS) receiver 13 and an autonomous drive sensor 14.

The GNSS receiver 13 receives positioning signals transmitted from multiple positioning satellites. The autonomous drive sensor 14 enables autonomous driving in an environment, such as in-tunnel driving, which has a low receiving sensitivity from the GNSS and cannot receive a positioning signal effectively. The autonomous drive sensor 14 is composed of a vehicle velocity sensor, a yaw rate sensor and a front-rear acceleration sensor.

The map locator calculator 12 performs localization from a movement distance and azimuth based on a vehicle velocity detected by the vehicle velocity sensor, a yaw rate (yaw angular velocity) detected by the yaw rate sensor, and a front-rear acceleration detected by the front-rear acceleration sensor.

The map locator calculator 12 includes a vehicle position estimation calculator 12a that estimates a vehicle position; a road map information acquirer 12b that performs map matching of an estimated vehicle position on a road map to identify the present location of the vehicle M1, and acquires road map information including environmental information on the surroundings of the present location; and a target travel path setting calculator 12c that sets a travel path (target travel path) which is a target of the vehicle M1.

The highly accurate road map database 16 is a large capacity storage device such as a hard disk drive (HDD), a solid state drive (SSD), and stores well-known highly accurate road map information (local dynamic map). The highly accurate road map information has a hierarchical structure in which additional map information used to assist automatic driving is superimposed on a static information layer in the bottom layer serving as the base.

The above-described road map information acquirer 12b acquires the present location and forward road map information from the road map information stored in the highly accurate road map database 16. The road map information includes surrounding environment information. As the surrounding environment information, not only static position information, but also dynamic position information are included, the static position information including the type (such as a general road and an expressway) of road, the road shape, the right and left division line, the road sign, the road marking such as a stop line, the intersection, and the traffic signal, the dynamic position information including traffic jam information, and traffic regulation due to an accident or construction.

For example, based on the destination set by a driver for automatic driving, information on route map from the vehicle position (the present location) estimated by the above-described vehicle position estimation calculator 12a to the destination is acquired from the road map information. The acquired route map information (traffic lane data on the route map and its peripheral information) is transmitted to the vehicle position estimation calculator 12a.

The vehicle position estimation calculator 12a obtains the position coordinates of the vehicle M1 based on the positioning signal received by the GNSS receiver 13. Map matching between the position coordinates and the route map information is performed to estimate the vehicle position (the present location) on the road map as well as identify the driving lane, and acquire, and successively store the road shape of the driving lane stored in the route map information.

Furthermore, in an environment, such as in-tunnel driving, in which an effective positioning signal from a positioning satellite cannot be received due to a low receiving sensitivity of the GNSS receiver 13, the vehicle position estimation calculator 12a switches to autonomous navigation, and performs localization by the autonomous drive sensor 14.

First, the target travel path setting calculator 12c sets a target travel path for automatically driving the vehicle M1 along a division line based on the present location obtained by map matching using the road map information acquirer 12b. Also, when a destination has been input by a driver, a target travel path is set along the travel route connecting the present location and the destination.

The target travel path is set in a several hundred meters to several kilometers range forward of the vehicle M1, and is updated successively at the time of driving. The target travel path set by the target travel path setting calculator 12c is read by the drive control unit 25 which is an automatic drive controller.

The stereo camera device 21 includes a first camera 22a and a second camera 22b which are autonomous sensors and image capturers that capture the situation around (mainly, forward of) the vehicle M1; an image processing unit (IPU) 23; and the forward drive environment recognizer 24 which is a drive recognizer as a drive environment recognition unit as well as a forward recognizer.

The first camera 22a and the second camera 22b are fixed to be arranged in a row at the position on the same line in the width direction at an upper area close to the windshield at the front in the cabin of the vehicle M1.

Multiple pieces of image data captured using these first camera 22a and second camera 22b undergo predetermined image processing in the IPU 23, and are output to the forward drive environment recognizer 24.

The forward drive environment recognizer 24 recognizes the road shape of the travel path (the vehicle travel path) on which the vehicle M1 drives, the presence of a preceding vehicle which drives ahead of the vehicle M1, a 3-D object including a moving object which is crossing immediately in front of the vehicle M1, signal indication (such as lighting, blinking, lighting color, and arrow direction), a road sign, and road marking based on a pair of image data (stereo image data) acquired using the first camera 22a and the second camera 22b.

The stereo camera device 21 calculates the distance to an object by using the principle of triangulation based on the focal length of the cameras, the base length between the cameras, and the parallax of the same object. Note that recognition of an object based on the stereo images and a method of determining the distance to the object are already well-known techniques, thus a detailed description here is omitted.

In the driving assistance device 1 of the embodiment, an autonomous sensor 10 as a detector to detect travel path information is composed of the first camera 22a and the second camera 22b of the stereo camera device 21. A drive environment recognizer 20 as a drive environment recognition unit is composed of the forward drive environment recognizer 24.

Note that the autonomous sensor 10 may include a radar device (not illustrated) in addition to the above-described stereo camera device 21. In one example, the radar device has an autonomous sensor as a detector using various radars for sensing devices, such as a millimeter wave radar, a laser radar, and a sensor using light detection and ranging (LIDAR).

The vehicle M1 having an autonomous sensor is provided with a surrounding drive environment recognizer that recognizes surrounding environment information such as a road sign and road marking, in addition to surrounding moving objects and other objects. The surrounding drive environment recognizer receives a signal from the autonomous sensor.

Note that in the embodiment, the forward drive environment recognizer 24 as the surrounding drive environment recognizer receives a signal from the autonomous sensor 10 (including an autonomous sensor, such as the stereo camera device 21 and the radar device (not illustrated, and may not be provided)).

The input side of the drive control unit 25 is coupled to the target travel path setting calculator 12c of the map locator calculator 12, and the forward drive environment recognizer 24 of the stereo camera device 21. Note that when the radar device is provided, the radar device is also coupled to the drive control unit 25.

In addition, the output side of the drive control unit 25 is coupled to a steering controller 31 that causes the vehicle M1 to drive along a target travel path; a brake controller 32 that causes the vehicle M1 to decelerate by forced brake control; an acceleration and deceleration controller 33 that controls the vehicle velocity of the vehicle M1; and a warning device 34.

The drive control unit 25 controls the steering controller 31, the brake controller 32, and the acceleration and deceleration controller 33, and performs drive control processing to automatically drive the vehicle M1 along the target travel path on the road map set by the target travel path setting calculator 12c, based on the positioning signal indicating the vehicle position received by the GNSS receiver 13.

In this process, the drive control unit 25 performs control such as well-known adaptive cruise control (ACC) and active lane keep (ALK) based on the forward drive environment information recognized by the forward drive environment recognizer 24. When a preceding vehicle is detected, the drive control unit 25 performs drive control to follow the preceding vehicle, and when a preceding vehicle is not detected, the drive control unit 25 performs control to drive the vehicle within a speed limit or at a predetermined set speed.

In addition, when a moving object which is crossing immediately in front of the vehicle M1 is detected or a prescribed road sign to indicate temporary stop or road marking such as a stop line is recognized based on the forward drive environmental information recognized by the forward drive environment recognizer 24, the drive control unit 25 performs control to appropriately operate the brake controller 32 according to the recognized information, and to cause the vehicle M1 to stop at a prescribed position.

Furthermore, when a moving object is not detected around the vehicle M1, and it is checked that the surrounding situation is safe for driving based on the forward drive environmental information recognized by the forward drive environment recognizer 24, the drive control unit 25 performs control (for example, control to slowly drive the vehicle according to the surrounding situation) to drive the vehicle M1 at an appropriate speed by operating the acceleration and deceleration controller 33.

The warning device 34 is a notifier as well as a notification device that notifies a driver of a warning (for example, a warning sound, warning display on an instrument panel) according to the environment recognized by the drive control unit 25 based on the forward drive environmental information recognized by the forward drive environment recognizer 24.

Alternatively, the warning device 34 may present various displays by a unit that causes a driver to audibly or visually recognize an indication (for example, stepping on the brake pedal, or performing steering corrective operation) to suggest an operation to be performed by a driver.

In one embodiment, as described above, the drive control unit 25 may serve as a "determiner" that makes various determinations for controlling the steering controller 31, the brake controller 32, the acceleration and deceleration controller 33, and the warning device 34 based on the output information from the forward drive environment recognizer 24 and the GNSS receiver 13. The schematic configuration of the driving assistance device 1 of the embodiment is as presented above.

The operation of the driving assistance device 1 of the embodiment will be described below. In the embodiment, the vehicle drive control will be exemplified, which is to be performed after temporary stop of a vehicle at a predetermined position before an intersection with poor visibility or before a stop line in the traveling direction of the vehicle M1, the temporary stop being caused by execution of temporary stop control performed by normal vehicle drive control during driving of the vehicle on which the driving assistance device 1 is mounted.

First, in the situation as described above, the surrounding situation of the vehicle may not be accurately recognized from the position where the vehicle M1 is stopped. For example, when a blind spot generated by a blocking object, such as a building, a wall, and planted trees, exists around the stop position of the vehicle M1, it is difficult to sufficiently recognize the surrounding situation (a situation such as pedestrians, bicycles, other vehicles on a crossing road, and traffic signals) of a forward intersection from the stop position of the vehicle M1.

In this situation, when the vehicle M1 enters a forward intersection from the first temporary stop position, a driver is expected to perform driving operations, such as recognizing the surrounding situation, driving the vehicle slowly while checking that the situation is safe for driving, and ensuring driving conditions which allow the vehicle to stop anytime.

Thus, the driving assistance device 1 of the embodiment aims to perform vehicle drive control to assist these series of driving operations.

FIG. 2 is a diagram conceptually illustrating a situation where a vehicle equipped with the driving assistance device of the embodiment of the disclosure is temporarily stopped at a predetermined position before an intersection with poor visibility.

The situation illustrated FIG. 2 assumes the case where the vehicle M1 drives along a travel path (see an arrow L illustrated in FIG. 2). For example, the vehicle M1 enters an intersection 40 with poor visibility (hereinafter simply referred to as an intersection 40) from a relatively narrow alleyway 101 (hereinafter simply referred to as an alleyway 101), then turns left to join a relatively wide arterial road 102 (the example of FIG. 2 illustrates a two-lane road, hereinafter simply referred to as an arterial road 102), then the vehicle M1 drives straight on the arterial road 102.

In this case, a stop line 101b is assumed to be provided on the alleyway 101 at a position before a road end (road edge) 101a in the traveling direction of the vehicle M1. Although a road sign is not illustrated in FIG. 2, a prescribed road sign to indicate temporary stop is assumed to be provided on the alleyway 101.

Here, the road ends 101a (hereinafter referred to as road edges 101a) are defined to indicate the cross points of the roadside edges of the alleyway 101 and the roadside edges of the arterial road 102 in the intersection 40 between the alleyway 101 and the arterial road 102. Therefore, the road edges 101a exist on both ends of the alleyway 101 in the lane width direction.

As described above, the stop line 101b is provided at a predetermined position on the alleyway 101. The stop line 101b is provided at a predetermined position on the near side of the intersection by several meters (1 to 2 meters) with respect to the line (the line indicating the roadside edge of the arterial road 102) connecting the road edges 101a on both ends of the alleyway 101, for example. The stop line 101b is road marking indicated on a road by, for example, white paint applied thereto. In normal case (when a road sign to indicate temporary stop is provided), the vehicle is obliged to temporarily stop at a predetermined position before the stop line 101b.

When a vehicle approaches the intersection 40 in such a configuration, the drive control unit 25 of the vehicle (the vehicle M1 is assumed in FIG. 2) recognizes a road sign (not illustrated) and a stop line based on the output from the forward drive environment recognizer 24 and the locator unit 11, thereby performing drive control to temporarily stop the vehicle at a predetermined position before the stop line 101b. The stop position in this case, that is, the position before the stop line 101b is called a first checkpoint A in the following description.

FIG. 2 illustrates a situation where another vehicle M2 is driving on the arterial road 102 from the right side to the left side (see an arrow S direction of FIG. 2) as viewed from the vehicle M1 which is about to enter the intersection from the alleyway 101. Here, at the moment illustrated in FIG. 2, the other vehicle M2 is in a state of not reaching the intersection forward of the alleyway 101.

Meanwhile, in FIG. 2, a symbol 100 indicates that blocking objects, such as a building, a wall, and planted trees, are present on the roadside edges of the alleyway 101, and the arterial road 102.

Although the details will be described below, a symbol B indicates a second checkpoint, and a symbol C indicates a third checkpoint in FIG. 2. Here, it is assumed that the first checkpoint A, the second checkpoint B, and the third checkpoint C each indicate the front-end position of the vehicle M1. Thus, in FIG. 2, the position of each of the second checkpoint B and the third checkpoint C illustrates only the front end of the vehicle M1.

Also, the dotted lines illustrated in FIG. 2 each indicate a horizontal angle of field (angle of view) of the stereo camera device 21 included in the autonomous sensor unit 22, and indicate the outline of an imaging range. Of these, the dotted line labeled with a symbol 21aa indicates the horizontal angle of field of the stereo camera device 21 when the vehicle M1 is stopped at the first checkpoint A. Similarly, in FIG. 2, the dotted line labeled with a symbol 21ab indicates the horizontal angle of field of the stereo camera device 21 when the vehicle M1 is stopped at the second checkpoint B. In addition, in FIG. 2, the dotted line labeled with a symbol 21ac indicates the horizontal angle of field of the stereo camera device 21 when the vehicle M1 is stopped at the third checkpoint C.

In this situation, the flow of the vehicle drive control performed when a vehicle equipped with the driving assistance device 1 of the embodiment is operated will be described below.

Figure 3:
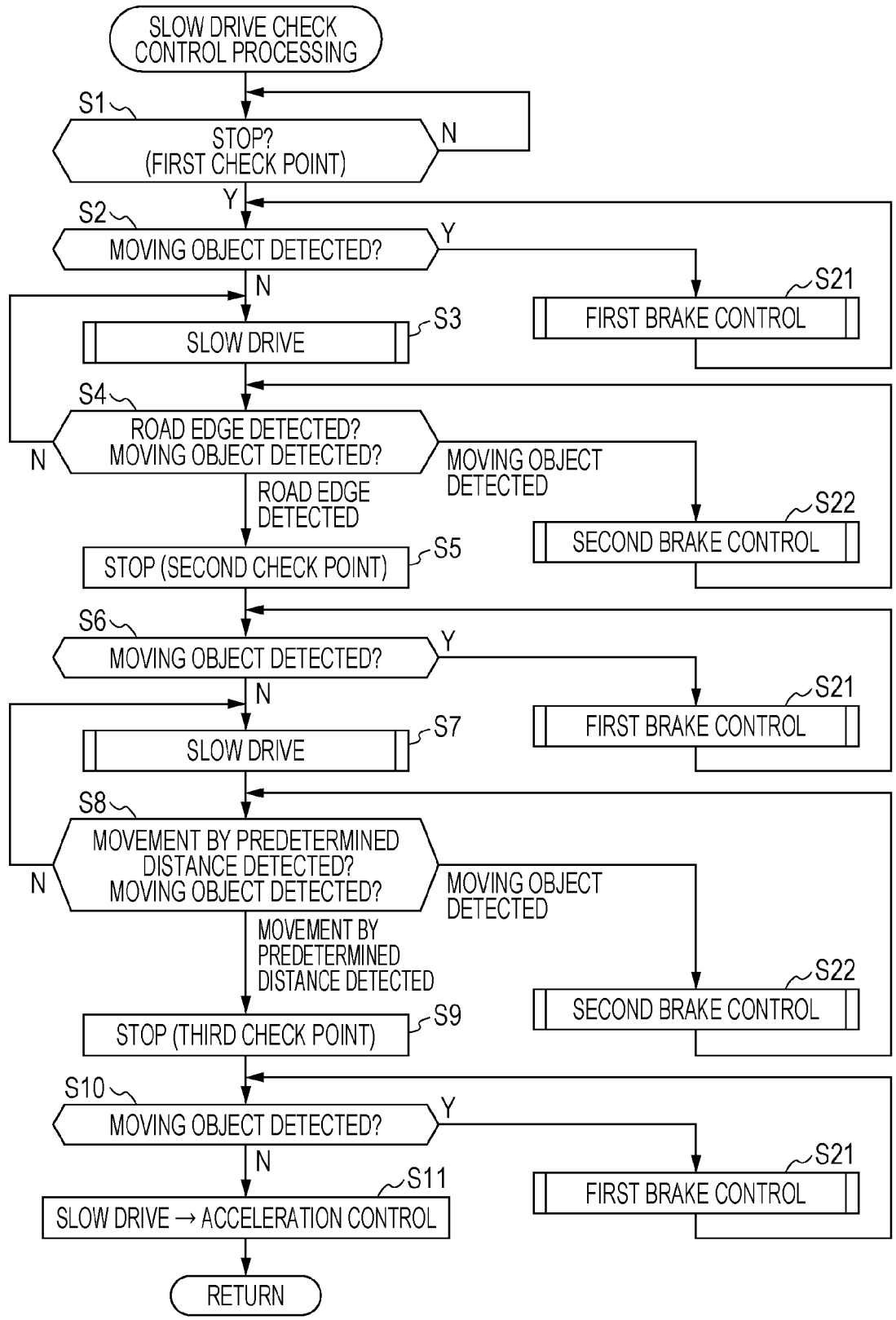
FIG. 3 is a flowchart illustrating the flow of slow drive check control processing performed after normal temporary stop control in the driving assistance device according to the embodiment of the disclosure.
Figure 4:
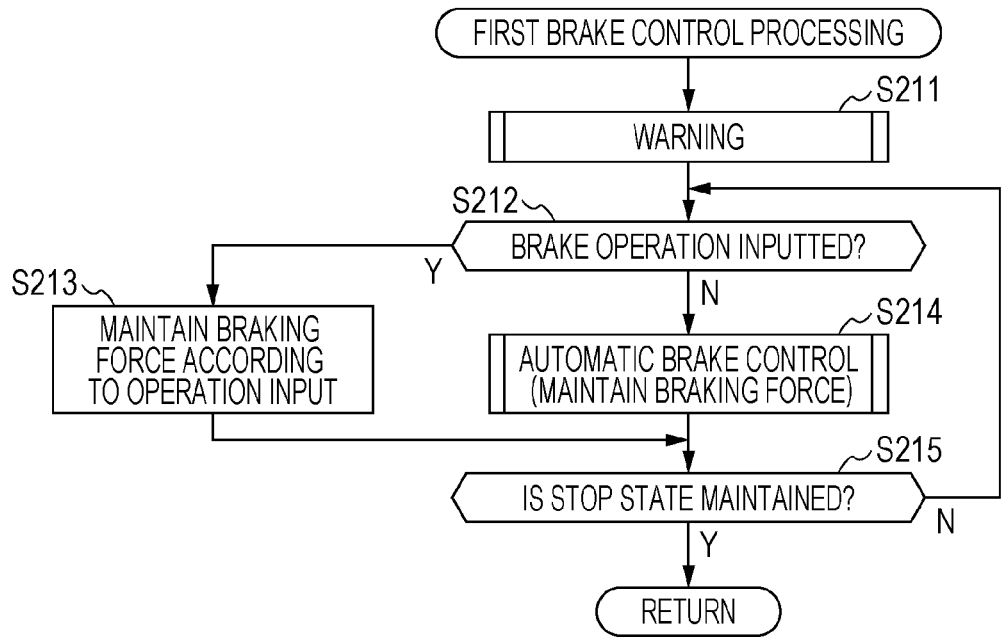
FIG. 4 is a flowchart illustrating the subroutine (the processing in step S21 of FIG. 3) of first brake control processing in the slow drive check control processing of FIG. 3.
Figure 5:
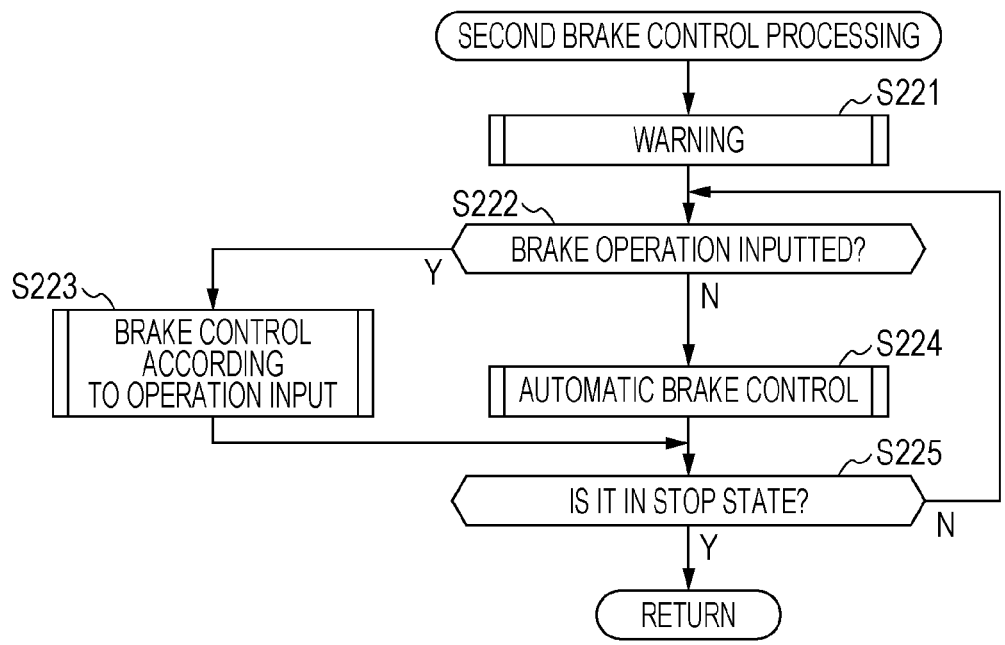
FIG. 5 is a flowchart illustrating the subroutine (the processing in step S22 of FIG. 3) of second brake control processing in the slow drive check control processing of FIG. 3.

FIGS. 3 to 5 are the flowcharts illustrating the operation of the driving assistance device 1 of an embodiment of the disclosure. Of these, FIG. 3 is a flowchart illustrating the flow of processing performed after normal temporary stop control in the driving assistance device 1 of the embodiment, in other words, the flow of slow drive check control processing. FIG. 4 is a flowchart illustrating the subroutine (the processing in step S21 of FIG. 3) of first brake control processing during the slow drive check control processing of FIG. 3. FIG. 5 is a flowchart illustrating the subroutine (the processing in step S22 of FIG. 3) of second brake control processing during the slow drive check control processing of FIG. 3.

First, it is assumed that a vehicle (vehicle M1) equipped with the driving assistance device 1 of the embodiment is driving on a general road while performing normal drive control. In this situation, as illustrated in FIG. 2, a case will be discussed in which the vehicle M1 is driving on the alleyway 101, and is about to enter the intersection 40 with poor visibility. At this point, as illustrated in FIG. 2, the vehicle M1 is assumed to be stopped at a predetermined position (the first checkpoint A) before the stop line 101b by normal temporary stop control processing performed by the drive control unit 25.

At this point, in step S1 of FIG. 3, the drive control unit 25 of the vehicle M1 first checks whether the vehicle M1 is in a state of temporary stop at a predetermined position, that is, the first checkpoint A. Here, when determining that the vehicle M1 is in a temporary stop state at the first checkpoint A, the drive control unit 25 proceeds to the processing in the next step S2.

However, when determining that the vehicle M1 is not in a temporary stop state at the first checkpoint A, the drive control unit 25 returns to the processing in step S1, and repeats the temporary stop check processing. Note that although illustration is omitted in FIG. 3 in this case, during the temporary stop check processing, predetermined brake control processing is performed according to the surrounding situation so that a temporary stop state is secured.

Next, in step S2, the drive control unit 25 performs forward situation recognition processing to recognize the surrounding situation (mainly in the traveling direction (forward)) of the vehicle M1 based on the output information from the forward drive environment recognizer 24. The forward situation recognition processing includes moving object detection processing to detect a moving object around (forward of) the vehicle M1. A well-known technique is applied to the moving object detection processing performed here. For example, the drive control unit 25 recognizes blocking objects, such as a building, a wall, and planted trees in addition to an object, such as a vehicle parking on the shoulder of a road, and a mobile object, such as a pedestrian and a bicycle based on the image data acquired by the stereo camera device 21, for example. For example, the hands and feet of a pedestrian and the front wheel of a bicycle can be easily recognized by pattern matching. A moving object can be detected by making, for example, time-series comparison between image data frame by frame of information (for example, outline information of the objects) on these recognized objects.

In this manner, when detecting a moving object around (forward of) the vehicle M1, the drive control unit 25 proceeds to the processing in step S21, and performs the first brake control processing in step S21. The details of the first brake control processing are illustrated in the flowchart of FIG. 4.

An overview of the first brake control processing is as described below. As described above, when the first brake control processing is about to start, the vehicle M1 is in a stop state at a predetermined position (a predetermined position before the stop line 101b at the time of step S2). Therefore, the brake control processing to be performed when the vehicle M1 is in this state is control processing to maintain the stop state of the present vehicle M1.

That is, the situation where the flow proceeds from the processing in step S2 of FIG. 3 to the processing in step S21 occurs when the vehicle M1 is in a stop state at a position in front of the stop line 101b, and a moving object is detected. In the situation where a moving object is present in the surroundings like this, the drive control unit 25 determines that the surrounding situation is not safe for driving the vehicle M1. Thus, the drive control unit 25 performs the first brake control processing (see FIG. 4) that is brake control processing to maintain the stop state of the present vehicle M1.

In one example, when the first brake control processing is performed, the drive control unit 25 first performs predetermined warning processing in step S211 of FIG. 4. The warning processing is, for example, by controlling the warning device 34, for outputting a predetermined warning sound, for turning on or displaying with blinking a predetermined warning indication light on an instrument panel, and/or for notifying a driver of guide display (for example, indication of words such as "step on the brake pedal" and "perform steering corrective operation") to suggest an operation to be performed by audio representation (audible unit) using a sound producing device such as a speaker or display of characters (visual unit) using a display such as a display device.

After the above-described warning processing in step S211 of FIG. 4, the drive control unit 25 checks whether brake operation input has been made in step S212. Here, the brake operation input is, for example, an input signal which is generated by an operation of the driver to step on the brake pedal. In other words, according to the above-described warning processing in step S211, checking to see whether the driver has performed a brake operation is made in the processing in step S212.

When a brake operation input is identified in this situation, the drive control unit 25 determines that a brake operation (for example, a brake pedal has been stepped on) has been performed by the driver, and proceeds to the processing in step S213. Note that the case where a brake operation input is identified at this point indicates the case where the brake operation performed by the driver is continued.

In step S213, the drive control unit 25 performs control processing to maintain a braking force according to the brake operation input. Subsequently, the drive control unit 25 proceeds to the processing in step S215.

When no brake operation input is identified in the processing in step S212 described above, the drive control unit 25 checks to see whether forced automatic brake control processing has been performed, and when execution of forced automatic brake control processing is identified, proceeds to the processing in step S214. When execution of forced automatic brake control processing is not identified at this point, the forced automatic brake control processing is then executed. Subsequently, the flow proceeds to the processing in step S214.

In step S214, the drive control unit 25 continues performing the automatic brake control processing currently in execution, and performs the control processing to maintain a predetermined braking force. Subsequently, the flow proceeds to the processing in step S215.

In step S215, the drive control unit 25 checks to see whether the stop state of the vehicle M1 is maintained. Here, when it is checked that the stop state is maintained, a series of processing is finished, and the flow returns to the processing in step S2 of FIG. 3 (return). However, when the stop state is not maintained, the flow returns to the processing in step S212 described above, and the same processing is repeated hereinafter.

Returning to FIG. 3, in step S2 described above, when a moving object is not detected around the vehicle M1, the flow proceeds to the processing in next step S3. In step S3, the drive control unit 25 performs slow drive control processing for driving the vehicle M1 at a low speed, that is, driving the vehicle M1 slowly. The slow drive control processing to be performed here is the control processing performed by the drive control unit 25 controlling the acceleration and deceleration controller 33. The slow drive control processing is well-known control processing in the art, thus a detailed description is omitted. Subsequently, the flow proceeds to the processing in step S4.

Next, in step S4, the drive control unit 25 performs forward situation recognition processing while continuing slow driving based on the output information from the forward drive environment recognizer 24. The forward situation recognition processing includes road edge detection processing to detect the road edge 101a forward on the alleyway 101 on which the vehicle M1 drives, and moving object detection processing to detect a moving object around (forward of) the vehicle M1. Well-known control processing is applied to the road edge detection processing.

Here, a brief description of the road edge detection processing is given as follows. The drive control unit 25 detects the roadside edge (such as a building wall, a fence, the edge of a flowerbed, a roadside belt, and a guardrail) to detect the road edge 101a based on the image data acquired, for example, by the stereo camera device 21. The moving object detection processing performed concurrently here is the same processing as the processing described in step S2.

When the road edge 101a and a moving object are not detected in step S4 described above, the flow returns to the processing in step S3 described above, and the slow driving is continued. In other words, in the processing in step S4, the slow driving is continuously performed until detection of the road edge 101a or a detection of a moving object is made. During this process, the forward situation recognition processing including the road edge detection processing and the moving object detection processing is continuously performed.

However, when a moving object is detected around (forward of) the vehicle M1 in step S4 described above, the drive control unit 25 proceeds to the processing in step S22, and performs the second brake control processing in step S22. The details of the second brake control processing are illustrated in the flowchart of FIG. 5.

An overview of the second brake control processing is as described below. As described above, when the second brake control processing is about to start, the vehicle M1 is in a slow driving state (the processing in step S3 of FIG. 3). Thus, the brake control processing to be performed when the vehicle M1 is in this state is the control processing for stopping the present vehicle M1 in the slow driving state by applying brake thereto.

That is, the situation where the flow proceeds from the processing in step S4 of FIG. 3 to the processing in step S22 occurs when a moving object is detected in the slow driving state of the vehicle M1. In the situation where a moving object is present in the surroundings like this, the drive control unit 25 determines that the surrounding situation is not safe for driving the vehicle M1. Thus, the drive control unit 25 performs the second brake control processing (see FIG. 5) which is brake control processing to change the slow driving state of the present vehicle M1 to the stop state.

In one example, when the second brake control processing is performed, the drive control unit 25 first performs predetermined warning processing in step S221 of FIG. 5. Similarly to the processing in step S211 of FIG. 4, the warning processing is for notifying the driver of a warning.

Subsequently, in step S222, the drive control unit 25 checks whether brake operation input has been made. In other words, according to the above-described warning processing in step S221, checking to see whether the driver has performed a brake operation is made in the processing in step S222.

When a brake operation input is identified in this situation, the drive control unit 25 determines that a brake operation has been performed by the driver, and proceeds to the processing in step S223.

In step S223, the drive control unit 25 performs brake control processing according to the brake operation input. Subsequently, the flow proceeds to the processing in step S225.

However, when no brake operation input is identified in the processing in step S222 described above, the drive control unit 25 proceeds to the processing in step S224, and performs automatic brake control processing to forcibly perform brake control in step S224. Subsequently, the flow proceeds to the processing in step S225.

In step S225, the drive control unit 25 checks to see whether the vehicle M1 is in the stop state. Here, when the stop state is checked, a series of processing is finished, and the flow returns to the processing in step S4 of FIG. 3 (return). However, when the stop state has not been achieved, the flow returns to the processing in step S222 described above, and the same processing is repeated hereinafter.

Returning to FIG. 3, in step S4 described above, when the road edge 101a is detected forward of the vehicle M1, the flow proceeds to the processing in next step S5.

In step S5, the drive control unit 25 controls the brake controller 32 to temporarily stop the slowly driving vehicle M1 at the second checkpoint B. Subsequently, the flow proceeds to the processing in step S6.

Here, as illustrated in FIG. 2, the second checkpoint B is defined to be the position slightly before the location where the line (the line indicating the roadside edge of the arterial road 102) connecting the road edges 101a on both ends of the alleyway 101 in the traveling direction of the vehicle M1, and the front end of the vehicle M1 substantially overlap.

The vehicle M1 stopped at the second checkpoint B does not protrude into the arterial road 102, thus is at a position which does not interfere with the traffic of vehicles driving on the arterial road 102, and pedestrians, bicycles moving along the roadside edge on the arterial road 102.

However, a blind spot exists forward of the vehicle M1 which is stopped at the second checkpoint B, thus it is still not possible to accurately recognize the surrounding situation of the vehicle. This can be concluded because as illustrated in FIG. 2, the angle of field 21ab of the stereo camera device 21 of the vehicle M1 at the second checkpoint B is blocked by blocking objects 100 on both side edges of the alleyway 101, thus a blind spot exists.

Thus, in the driving assistance device 1 of the embodiment, the vehicle is driven slowly from the first checkpoint A (the position before the stop line 101b) to the second checkpoint B (the position before the line connecting the road edges 101a on both ends), and is temporarily stopped at the second checkpoint B, then the surrounding situation is checked again.

In step S6 of FIG. 3, the drive control unit 25 performs the forward situation recognition processing including the moving object detection processing again to detect a moving object around (forward of) the vehicle M1 based on the output information from the forward drive environment recognizer 24. The moving object detection processing performed concurrently here is the same as the processing in steps S2 and S4 described above.

When detecting a moving object around (forward of) the vehicle M1 in the processing in step S6, the drive control unit 25 performs the processing (the first brake control processing, see FIG. 4) in step S21. That is, at the time of step S6, the vehicle M1 is in the stop state. Thus, here, the first brake control processing is executed. After the execution of the first brake control processing of FIG. 4, the flow returns to the processing in step S6 of FIG. 3 (return).

However, when a moving object is not detected around the vehicle M1 by the processing in step S6, the flow proceeds to the processing in next step S7, and the drive control unit 25 controls the acceleration and deceleration controller 33 to perform slow drive control processing in step S7. The slow drive control processing performed here is the same as the processing in step S3 described above. Subsequently, the flow proceeds to the processing in step S8.

Next, in step S8, the drive control unit 25 performs the forward situation recognition processing, based on the output information from the forward drive environment recognizer 24, while continuing slow driving. The forward situation recognition processing includes predetermined distance movement detection processing to detect a movement distance of the vehicle M1, and the moving object detection processing to detect a moving object around (forward of) the vehicle M1.

Here, the predetermined distance movement detection processing is processing to calculate a movement distance of the vehicle M1 based on, for example, the output from the forward drive environment recognizer 24 and the locator unit 11, and to detect whether the vehicle M1 has been moved by a predetermined distance.

The predetermined distance in this case refers to the distance from the second checkpoint B where the vehicle M1 is stopped to the third checkpoint C. Here, the third checkpoint C is defined as the position which allows the vehicle M1 to accurately recognize the surrounding situation. At this point, the vehicle M1 is at a position which does not interfere with the traffic of the vehicle M2 which drives on the arterial road 102 with the front end of the vehicle M1 slightly protruding from the alleyway 101 into the arterial road 102. As illustrated in FIG. 2, this indicates a situation where the angle of field 21ac of the stereo camera device 21 of the vehicle M1 at the third checkpoint C is not blocked by the blocking objects 100 around the vehicle M1. Note that at this point, in addition to the stereo camera device 21, for example, a radar device (not illustrated) installed near the vehicle front end may be used as a unit which recognizes the surrounding environment. In the case of such a configuration, the protruding distance of the vehicle M1 to the arterial road 102 can be further reduced.

Note that well-known control processing is applied to predetermined distance movement detection processing to be performed here. Thus, a description of the predetermined distance movement detection processing is omitted. The moving object detection processing performed concurrently here is the same as the processing explained in the processing in steps S2, S4, and S6 described above.

When movement by a predetermined distance and a moving object are not detected in step S8 described above, the flow returns to the processing in step S7, and the slow driving is continued. In one example, in the processing in step S8, the slow driving is continuously performed until movement by a predetermined distance is detected (until the third checkpoint C is reached) or a moving object is detected. Then, during this period, the forward situation recognition processing including the predetermined distance movement detection processing and the moving object detection processing is continuously performed.

However, when detecting a moving object around (forward of) the vehicle M1 in step S8 described above, the drive control unit 25 performs the processing (the second brake control processing, see FIG. 5) in step S22. That is, at the time of step S8, as described above, the vehicle M1 is in the slow driving state (the processing in step S7 of FIG. 3). Thus, here, the second brake control processing is executed. After the execution of the second brake control processing of FIG. 5, the flow returns to the processing in step S8 of FIG. 3 (return).

On the other hand, in step S8 described above, when the vehicle M1 moves by a predetermined distance only, and reach to the third checkpoint C is detected, the flow proceeds to the next step S9.

In step S9, the drive control unit 25 controls the brake controller 32 to temporarily stop the slowly driving vehicle M1 at the third checkpoint C. Subsequently, the flow proceeds to the processing in step S10.

In this manner, in the driving assistance device 1 of the embodiment, the vehicle M1 is slowly driven from the second checkpoint B (the position before the line connecting the road edges 101a on both ends) to the third checkpoint C (the position which allows the vehicle M1 to accurately recognize the forward surrounding situation), and is temporarily stopped at the third checkpoint C, then the surrounding situation is checked again.

In other words, in step S10, the drive control unit 25 performs the forward situation recognition processing including the moving object detection processing to detect a moving object around the vehicle M1 again based on the output information from the forward drive environment recognizer 24. The moving object detection processing performed here is the same as the processing in steps S2, S4, S6, and S8 described above.

When detecting a moving object around (forward of) the vehicle M1 in the processing in step S10, the drive control unit 25 performs the processing (the first brake control processing, see FIG. 4) in step S21. That is, at the time of step S10, the vehicle M1 is in the stop state. Thus, here, the first brake control processing is executed. After the execution of the first brake control processing of FIG. 4, the flow returns to the processing in step S10 of FIG. 3 (return).

However, when a moving object is not detected around (forward of) the vehicle M1 in the processing in step S10, the drive control unit 25 proceeds to the processing in the next step S11.

In step S11, the drive control unit 25 controls the acceleration and deceleration controller 33 to perform the slow drive control processing and the acceleration control processing. Thus, the vehicle M1 drives slowly in a safe situation, enters the intersection 40 from the alleyway 101, and subsequently, joins the arterial road 102, then performs acceleration control, and is ready for shifting to normal drive control.

In the situation illustrated in FIG. 2, subsequently, the drive control unit 25 further controls the steering controller 31 to perform left turn control processing (not illustrated) as well as controls the acceleration and deceleration controller 33 to perform acceleration control processing (not illustrated), thus performs drive control to drive on the arterial road 102 along the arrow L of FIG. 2. Note that well-known control processing is applied to the left turn control processing and the acceleration control processing performed here. Thus, a description of these control processing is omitted.

In addition, even during the execution of these various types of control processing, the drive control unit 25 continuously performs the forward situation recognition processing, and, for example, when a moving object is detected forward of the vehicle M1, control is performed so that predetermined brake control processing is immediately executed to enable the vehicle M1 to avoid the detected moving object. Thus, after the processing in step S11 described above, the flow returns to the original main flow (not illustrated) (return).

Note that in the example described above, in the first brake control processing of FIG. 3 and the second brake control processing of FIG. 4, as the processing flow after detection of a moving object, the warning processing is performed, then an operation input is to be checked, and predetermined brake control processing is to be performed. However, such a processing flow is not always the case.

As another processing flow, for example, the following processing may be performed: after detection of a moving object, warning processing is performed using a warning sound and a warning indication light and concurrently, automatic brake control processing is immediately performed to apply forced braking.

Also, as another example of warning processing, the following processing may be performed: without or concurrently with warning notification by a warning sound or warning display, brake control, such as application of light (weak) braking recognizable by a driver, is interrupted.

In the example described above, after temporary stop is made at the first checkpoint A, the vehicle is slowly driven while checking the surrounding situation, and temporary stop is made at each point of the second checkpoint B and the third checkpoint C. However, the disclosure is not limited to such control processing.

As another processing, the following control processing may be performed: for example, after temporary stop is made at the first checkpoint A, slow driving is continuously performed while checking the surrounding situation, and the vehicle passes through the second checkpoint B and the third checkpoint C by slow driving. Note that even during slow driving, when a moving object is detected by check processing of surrounding situation, brake control is immediately performed to stop the vehicle. Note that in any case, temporary stop at the first checkpoint A is required.

The illustration described above is an example of an operation among the operations of the driving assistance device of the embodiment of the disclosure. The operation (operation when the vehicle enters the intersection after safety check) is to be performed, particularly, at the intersection (40, see FIG. 2) with poor visibility, after a driving vehicle on the alleyway makes a temporary stop according to a road sign.

The illustration described next is another example of an operation among the operations of the driving assistance device 1 of the embodiment. The operation (operation when the vehicle enters the intersection after safety check) is to be performed, for example, at an intersection with good visibility, after a driving vehicle makes a temporary stop due to indication of a traffic signal.

For example, at an intersection with good visibility where there is no blocking object in the surroundings and arterial roads (for example, a road with two lanes on each side) with a relatively large width cross each other, the vehicle is assumed to be temporarily stopped at a position before a stop line due to indication of red light of a traffic signal ahead.

In such a situation, when indication of a traffic signal forward of the vehicle changes from red light to green light, right after the change of traffic signal indication, for example, other vehicles may be still driving on the road crossing the traveling road of the vehicle, or an emergency vehicle may be approaching. Also, other vehicles still turning right or turning left from the crossing road may remain in the intersection due to traffic jam on the traveling road of the vehicle, and may block the traveling road forward of the vehicle. In addition, pedestrians and/or bicycles may still be crossing immediately in front of the position where the vehicle is stopped, and on a crosswalk or a road forward in the traveling direction.

In such a situation, even when indication of a traffic signal forward of the vehicle is a green light, it may be unsafe for the vehicle to immediately start to move, and enter the intersection. Thus, in such a case, that is, when indication of a traffic signal changes from a red light to a green light, and the vehicle enters from the initial stop position to the intersection ahead, the driver is expected to perform driving operations, such as recognizing the surrounding situation first, and starting to slowly drive the vehicle after checking that the surrounding situation is safe for starting to drive while ensuring driving conditions to allow the vehicle to stop anytime.

Thus, the driving assistance device 1 of the embodiment performs vehicle drive control to assist these series of operations.

Figure 6:
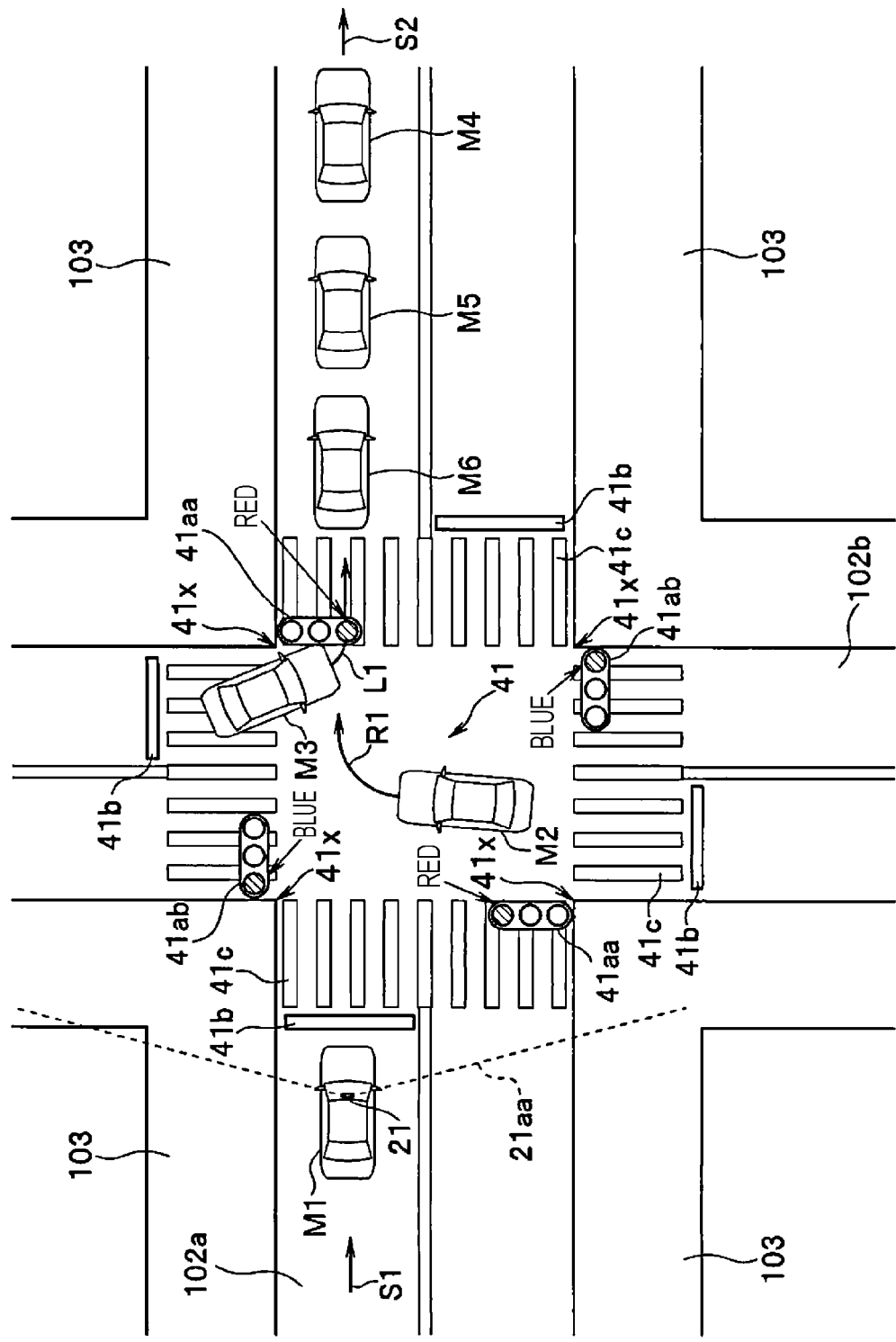
FIG. 6 is a conceptual diagram illustrating a situation for explaining another operation of a vehicle equipped with the driving assistance device according to the embodiment of the disclosure.
Figure 7:
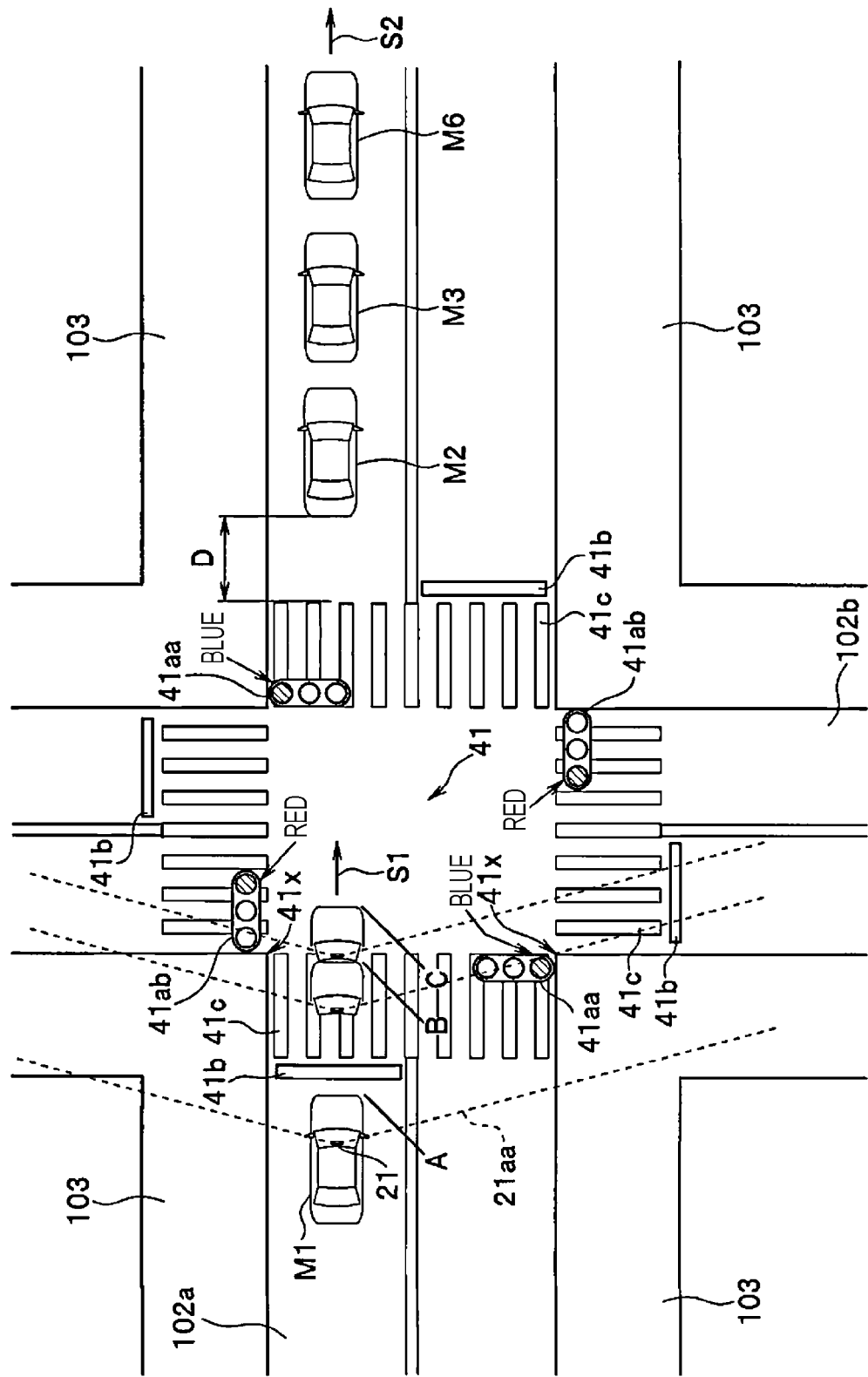
FIG. 7 is a conceptual diagram illustrating an example of a situation when indication of a traffic signal changes after the situation of FIG. 6.

FIG. 6 is a diagram conceptually illustrating a situation where a vehicle is temporarily stopped at a predetermined position due to indication of a traffic signal at an intersection with good visibility, the vehicle being equipped with the driving assistance device of the embodiment of the disclosure. FIG. 7 is a diagram conceptually illustrating an example of a situation where indication of a traffic signal changes after the situation of FIG. 6.

The situation in FIG. 6 illustrates the case where, for example, the vehicle M1, which is driving straight in an arrow S1 direction of FIG. 6 on an arterial road 102*a*, is about to enter an intersection 41 with good visibility, and a traffic signal 41*aa* (forward) in the traveling direction of the vehicle M1 among the traffic signals installed at the intersection 41 presents a red light. Thus, in the situation illustrated in FIG. 6, the vehicle M1 is temporarily stopped at a position before a stop line 41*b*.

Here, at the intersection 41, two arterial roads (102*a*, 102*b*) with a relatively large width cross each other. The two arterial roads (102*a*, 102*b*) illustrated in FIG. 6 are each an up-and-down two-lane road. It is illustrated that the two arterial roads (102*a*, 102*b*) are each provided with sidewalks 103 along the roadsides on both sides. Also, traffic signals 41*aa* and 41*ab*, the stop lines 41*b*, and crosswalks 41*c* are provided near the intersection 41 at predetermined positions corresponding to the arterial roads (102*a*, 102*b*).

At this point, as described above, the traffic signal 41*aa* (forward) in the traveling direction of the vehicle M1 presents a red light. Thus, the traffic signal 41*ab* of the road 102*b* crossing the arterial road (hereinafter simply referred to as a road) 102*a* on which the vehicle M1 drives presents a green light. Thus, another vehicle M2 (the vehicle on the right as viewed from the vehicle M1) driving on the road 102*b* is temporarily stopped near the center of the intersection 41 in order to turn right at the intersection 41 and drive in an arrow R1 direction. In addition, another vehicle M3 (the vehicle on the left as viewed from the vehicle M1) driving on the road 102*b* is temporarily stopped at a position before a crosswalk 41*c* in order to turn left at the intersection 41 and drive in an arrow L1 direction.

Furthermore, at this point, multiple other vehicles M4, M5, and M6 are preceding in an arrow S2 direction of FIG. 6 on the travel path forward of the road 102*a* on which the vehicle M1 drives, and away from the intersection 41, thus traffic jam has occurred. The other vehicle M6 at the end of the traffic jam is temporarily stopped near the crosswalk 41*c* of the intersection 41, thus the other vehicle M3 is in a temporarily stop state in the intersection 41 on a course to enter the road 102*a*. Similarly, the other vehicle M2 is unable to complete the right turn because the other vehicle M3 remains in the intersection 41, and is in a temporarily stop state in the intersection 41.

Currently, the vehicle M1 is temporarily stopped at a position before the stop line 41*b*. When indication of the traffic signal 41*aa* changes from a red light to a green light, in response to this, the vehicle M1 is going to enter the intersection 41, and drives straight.

Note that symbols 41*x* illustrated in FIG. 6 each indicate a road end (road edge). Here, the road ends 41*x* (hereinafter referred to as the road edges 41*x*) are defined to indicate the positions where respective roadside edges of two roads (102*a*, 102*b*) cross in the intersection 41. Therefore, the road edges 41*x* in the intersection 41 exist on both ends of the roads (102*a*, 102*b*) facing the intersection 41 in the lane width direction, thus four road edges exist in the intersection 41 (see FIG. 6).

The dotted line labeled with a symbol 21*aa* in FIG. 6 indicates the horizontal angle of field (angle of view) of the stereo camera device 21, and indicates the outline of an imaging range.

As described above, the stop lines 41*b* and the crosswalks 41*c* are provided near the intersection 41. In this case, the crosswalks 41*c* are each provided at a predetermined position of the intersection 41 outward of the line connecting corresponding road edges 41*x* on both ends in the road width direction (the line connecting the roadside edges of two roads 102*a* and 102*b*, not illustrated). The stop line 41*b* is provided at a position (position away from the intersection 41) before the crosswalk 41*c*. The stop line 41*b* and the crosswalk 41*c* are road markings indicated by, for example, white paint applied to the road. When indication of the traffic signal ahead is a red light, the vehicle is obliged to stop at a position before the stop line 41b. As well known, a vehicle approaching the intersection 41 with traffic signals is obliged to drive or stop according to the indication of the traffic signals installed face to face (forward) in the traveling direction of the vehicle.

When the vehicle M1 approaches the intersection 41 in this form, the drive control unit 25 of the vehicle M1 recognizes the surrounding situation including the state of indication of the traffic signal 41aa based on the output from the forward drive environment recognizer 24 and the locator unit 11. At this point, when the traffic signal 41aa indicates a red light (in the case of the example illustrated in FIG. 6), drive control is performed to temporarily stop the vehicle at a predetermined position before the stop line 41b. The stop position at this point, in other words, the position before the stop line 41b is referred to as a first checkpoint A in the following description.

Although the details will be described later, in FIG. 7, symbol B indicates the second checkpoint, and symbol C indicates the third checkpoint. Here, the first checkpoint A, the second checkpoint B, and the third checkpoint C each indicate the front-end position of the vehicle M1. Thus, in FIG. 7, the position of each of the second checkpoint B and the third checkpoint C is indicated by illustrating only the front-end portion of the vehicle M1.

At the moment illustrated in FIG. 6, the vehicle M1 is temporarily stopped at the first checkpoint A due to red light indication of the traffic signal 41aa. However, at this point, the other vehicles M2 and M3 are in the intersection on the road 102b crossing the road 102a on which the vehicle M1 drives.

It is assumed that the situation illustrated in FIG. 7 has occurred after a lapse of a predetermined time since the situation illustrated in FIG. 6. Here, the situation illustrated in FIG. 7 indicates the one after the traffic signal 41aa of the road 102a on which the vehicle M1 drives changes to a green light, and the traffic signal 41ab of the road 102b crossing the road 102a changes to a red light.

In this situation, for example, the other vehicles M4 and M5, which have been temporarily stopped due to traffic jam on the road 102a in FIG. 6, drive in the arrow S2 direction of FIG. 7, and are no longer illustrated. However, the traffic jam situation on the road 102a continues, and in addition to the other vehicle M6 at the end of the traffic jam, the other vehicle M3 turning left in FIG. 6 has completed the left turn, and follows the other vehicle M6 on the road 102a. Furthermore, the other vehicle M2 turning right in FIG. 6 has completed the right turn, and follows the other vehicle M3 on the road 102a. At this point, it is assumed that in the range away from the intersection 41 on the road 102a, an area (an area labeled with a symbol D of FIG. 7) is left such that the distance between the rear end of the vehicle M2 at the end of the traffic jam and the crosswalk 41c is less than the length of one vehicle.

In normal case, temporary stop in the intersection and on the crosswalk is basically prohibited. Therefore, as described above, in a situation where space for the vehicle M1 to enter is not present in the range away from the intersection 41 on the road in the traveling direction, even when the traffic signal 41aa ahead indicates a green light, it is recommended to check the surrounding situation, and maintain a temporary stop state of the vehicle M1 at the position (the first checkpoint A) before the stop line 41b without causing the vehicle M1 to enter the intersection 41 until space for the vehicle M1 to enter is found in the range away from the intersection 41.

Immediately after red light indication of the traffic signal 41aa changes to green light indication, pedestrians and/or bicycles may still be crossing the forward crosswalk 41c. In consideration of these, when the vehicle M1 temporarily stopped due to red light indication of the traffic signal 41aa recognizes change in the indication of the traffic signal 41aa to a green light, before starting to drive, the vehicle M1 first recognizes the surrounding situation, and after checking the safety of the surrounding and the forward area, the vehicle M1 starts to drive.

Figure 8:
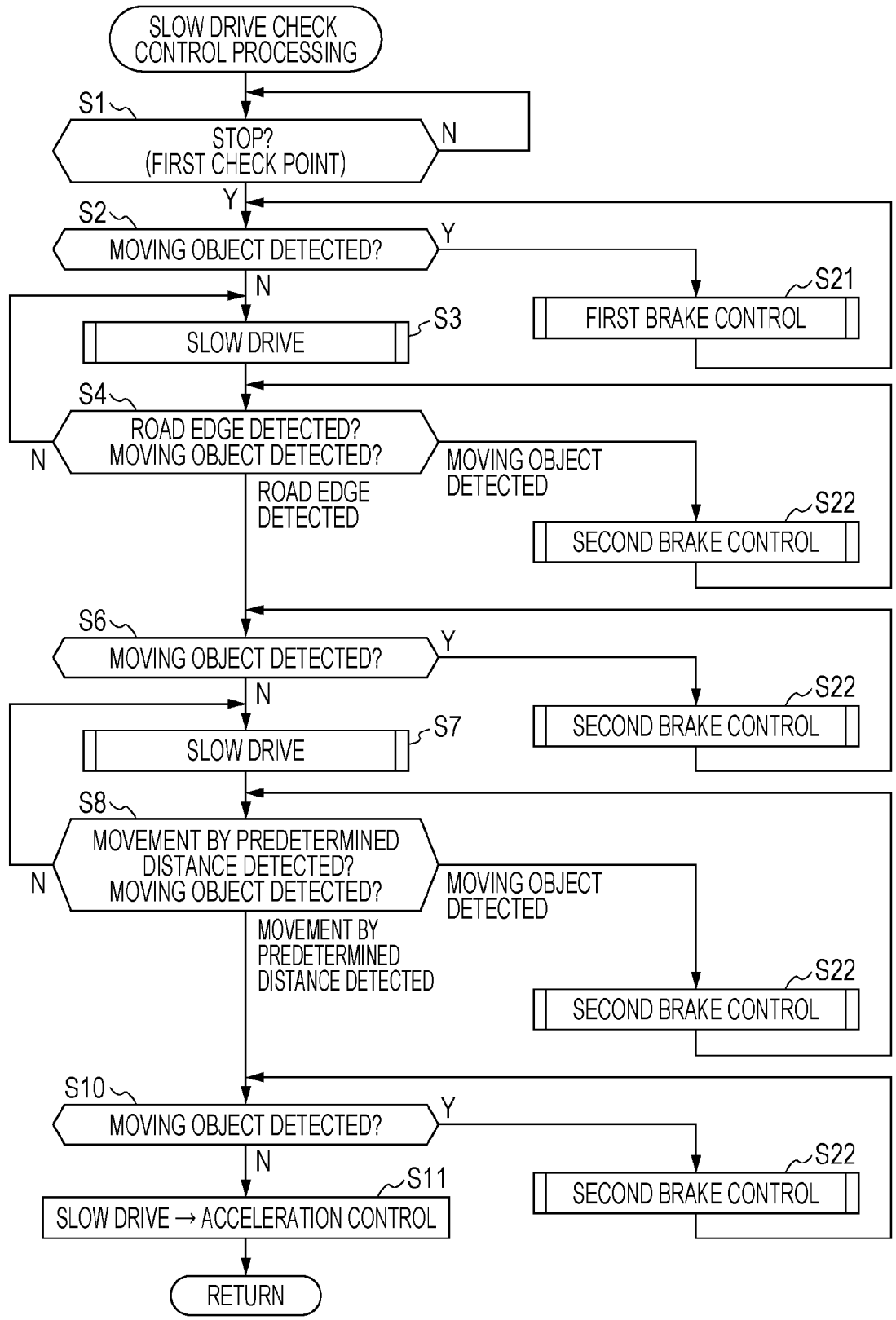
FIG. 8 is a flowchart illustrating another example of the slow drive check control processing performed after normal temporary stop control in the driving assistance device according to the embodiment of the disclosure.

In the assumed situation as described above, the flow of the vehicle drive control when a vehicle equipped with the driving assistance device 1 of the embodiment is operated will be described below. FIG. 8 is a flowchart illustrating another example of the slow drive check control processing performed after normal temporary stop control in the driving assistance device according to the embodiment of the disclosure. Note that basically, the slow drive check control processing illustrated in FIG. 8 is substantially the same as the control processing illustrated in the above-described flowchart of FIG. 3. Thus, the processing same as that in the flowchart illustrated in FIG. 3 is labeled with the same step symbol, and a description is omitted or given in a simplified form, and only different processing flow will be described in detail below.

First, it is assumed that a vehicle (vehicle M1) equipped with the driving assistance device 1 of the embodiment is driving on a general road while performing normal drive control. In this situation, it is assumed that the vehicle M1 is driving on the road 102a, and is about to enter the intersection 41 ahead with the traffic signal 41aa installed. At this point, as illustrated in FIG. 6, the traffic signal 41aa is assumed to indicate a red light. In this case, the vehicle M1 is stopped at a predetermined position (the first checkpoint A) before the stop line 41b in the traveling direction of the vehicle M1, by normal temporary stop control processing by the drive control unit 25.

In this state, first, in step S1 of FIG. 8, the drive control unit 25 of the vehicle M1 checks to see whether the vehicle M1 is in a temporarily stop state at the first checkpoint A. When determining that the vehicle M1 is in a temporarily stop state at the first checkpoint A, the drive control unit 25 proceeds to the processing in the next step S2.

However, when the drive control unit 25 determines that the vehicle M1 is not in a temporarily stop state at the first checkpoint A, the flow returns to the processing in step S1, and repeats the temporary stop check processing.

Note that during the temporary stop check processing, predetermined brake control processing is performed according to the surrounding situation, and the temporarily stop state is continued.

Subsequently, in step S2, the drive control unit 25 performs the forward situation recognition processing including the moving object detection processing to detect a moving object around (mainly, forward of) the vehicle M1 based on the output information from the forward drive environment recognizer 24. The moving object detection processing is a well-known technique, and recognizes, for example, an object, such as a vehicle parking on the shoulder of a road, a pedestrian or a bicycle crossing the crosswalk 41c immediately in front of the vehicle M1, based on, for example, the image data acquired by the stereo camera device 21.

When detecting a moving object around the vehicle M1 in step S2, the drive control unit 25 proceeds to the processing in step S21, and performs the first brake control processing in step S21. As the first brake control processing, the same processing (the control processing to maintain a stop state of the vehicle M1) as in the above-described flowchart illustrated in FIG. 4 is applied.

Subsequently, in step S2, when a moving object is not detected around the vehicle M1, the flow proceeds to the processing in the next step S3. In step S3, the drive control unit 25 performs the slow drive control processing to cause the vehicle M1 to drive slowly. Subsequently, the flow proceeds to the processing in step S4.

Subsequently, in step S4, the drive control unit 25 performs forward situation recognition processing while continuing the slow driving based on the output information from the forward drive environment recognizer 24, the forward situation recognition processing including road edge detection processing to detect the road edge 41x forward of the vehicle M1, and the moving object detection processing to detect a moving object around the vehicle M1.

In this case, when the road edge 41x and a moving object are not detected in step S4 described above, the flow returns to the processing in step S3, and the slow driving is continued. During this period, the forward situation recognition processing including the road edge detection processing and the moving object detection processing is continuously performed.

However, in step S4 described above, when detecting a moving object around the vehicle M1, the drive control unit 25 proceeds to the processing in step S22, and performs the second brake control processing in step S22. As the second brake control processing, the same processing (the control processing to stop the vehicle M1 in a slow driving state by applying brake thereto) as in the above-described flowchart illustrated in FIG. 5 is applied.

On the other hand, when the road edge 41x is detected forward of the vehicle M1 in step S4 described above, the flow proceeds to the processing in the next step S6.

Note that also in the moving object detection processing performed concurrently with the slow drive processing during this period, when the slow driving is continuously performed without a moving object being detected, the vehicle M1 passes through the second checkpoint B labeled with the symbol B illustrated in FIG. 7. In the flowchart of FIG. 8, when no problem is found in the surrounding situation (safe driving is possible), the slow driving is continued without causing temporary stop at the second checkpoint B. In other words, since the visibility of the surroundings is favorable during the slow driving of the vehicle M1 near the second checkpoint B, the surrounding situation can be recognized sufficiently. Therefore, in the situation described in this example, the surrounding situation can be recognized without making temporary stop at the second checkpoint B, thus safety check can be made.

In step S6 of FIG. 8, the drive control unit 25 performs the forward situation recognition processing including the moving object detection processing to detect a moving object around the vehicle M1 again based on the output information from the forward drive environment recognizer 24. The moving object detection processing is the same as the processing in steps S2 and S4 described above.

When detecting a moving object around vehicle M1 in the processing in step S6, the drive control unit 25 executes the second brake control processing (see FIG. 5) in step S22. After the execution of the second brake control processing of FIG. 5, the flow returns to the processing in step S6 of FIG. 8 (return).

However, when no moving object is detected around the vehicle M1 in the processing in step S6, the drive control unit 25 proceeds to the processing in the next step S7, and controls the acceleration and deceleration controller 33 to perform the slow drive control processing in the step S7.

The slow drive control processing is the same as the processing in step S3 described above. Subsequently, the flow proceeds to the processing in step S8.

Subsequently, in step S8, the drive control unit 25 performs forward situation recognition processing while continuing the slow driving based on the output information from the forward drive environment recognizer 24, the forward situation recognition processing including predetermined distance movement detection processing to detect a movement distance of the vehicle M1, and the moving object detection processing to detect a moving object around the vehicle M1.

Here, when movement of a predetermined distance and a moving object are not detected in step S8, the flow returns to the processing in step S7 described above, and the slow driving is continued. During this period, the forward situation recognition processing including the predetermined distance movement detection processing and the moving object detection processing is continuously performed.

However, when detecting a moving object around the vehicle M1 in step S8, the drive control unit 25 executes the second brake control processing (see FIG. 5) in step S22. After the execution of the second brake control processing of FIG. 5, the flow returns to the processing in step S8 of FIG. 8 (return).

In step S8, when it is detected that the vehicle M1 has moved by a predetermined distance and the third checkpoint C has been reached, the flow proceeds to the processing in the next step S10.

Note that also in the moving object detection processing performed concurrently with the slow drive processing during this period, when the slow driving is continuously performed without a moving object being detected, the vehicle M1 passes through the third checkpoint C labeled with the symbol C illustrated in FIG. 7. In the flowchart of FIG. 8, when no problem is found in the surrounding situation (safe driving is possible), the slow driving is continued without causing temporary stop at the third checkpoint C. In other words, since the visibility of the surrounding situation is favorable during the slow driving of the vehicle M1 near the third checkpoint C as well, the surrounding situation can be recognized sufficiently. Therefore, in the situation described in this example, the surrounding situation can be recognized without making temporary stop at the third checkpoint C, thus safety check can be made.

In step S10 of FIG. 8, the drive control unit 25 performs the forward situation recognition processing including the moving object detection processing to detect a moving object around the vehicle M1 again based on the output information from the forward drive environment recognizer 24. The moving object detection processing is the same as the processing in steps S2, S4, S6, and S8 described above.

When detecting a moving object around vehicle M1 in the processing in step S10, the drive control unit 25 executes the second brake control processing (see FIG. 5) in step S22. After the execution of the second brake control processing of FIG. 5, the flow returns to the processing in step S10 of FIG. 8 (return).

However, when no moving object is detected around (forward of) the vehicle M1 in the processing in step S10, the drive control unit 25 proceeds to the processing in the next step S11.

In step S11, the drive control unit 25 controls the acceleration and deceleration controller 33 to perform the slow drive control processing and the acceleration control processing. Thus, the vehicle M1 drives slowly in a safe situation, enters the intersection 41 from the road 102a, and then performs acceleration control, and is ready for shifting to normal drive control. In addition, even during the execution of these various types of control processing, the drive control unit 25 continuously performs the forward situation recognition processing, and, for example, when a moving object is detected forward of the vehicle M1, control is performed so that predetermined brake control processing is immediately executed to enable the vehicle M1 to avoid the detected moving object. Thus, after the processing of step S11 described above, the flow returns to the original main flow (not illustrated) (return).

Note that in another example described above, a description has been given in an assumed situation where when the traffic signal 41aa on the road 102a on which the vehicle M1 drives changes to a green light, space for the vehicle to enter is not present on the road away from the intersection 41 in the traveling direction. However, the assumed situation is not limited to this. For example, even in a situation where the other vehicle M2 or the other vehicle M3 cannot complete right or left turn and remains in the intersection 41 on the road in the traveling direction of the vehicle M1, the same drive control is performed.
The same drive control is applied even if an emergency vehicle is approaching the intersection 41. In addition, the same drive control is applied even in a situation where a pedestrian and/or a bicycle cross in front of the vehicle M1.

As described above, according to an embodiment of the disclosure, as in the example illustrated in FIG. 2 for example, particularly, at the intersection 40 with poor visibility or at a position before a stop line, after the vehicle is temporarily stopped by temporary stop control processing using the normal vehicle drive control, the surrounding situation (particularly, forward) in the traveling direction of the vehicle is checked based on the output information of the forward drive environment recognizer 24 which is a forward recognizer, and the vehicle is slowly driven while checking that the surrounding situation is safe for driving the vehicle. During this period, the vehicle is temporarily stopped each time at each of predetermined positions, such as a position (the second checkpoint B, see FIG. 2) before the road edge 101a (see FIG. 2) in the traveling direction of the vehicle M1, and a position (the third checkpoint C, see FIG. 2) which allows the vehicle to accurately recognize the forward surrounding situation, and the safety of the surrounding situation is checked sufficiently.

Thus, consequently, the driving assistance device 1 of the embodiment can recognize not only detection of a moving object, but also detection of various obstacles and blocking objects existing at the roadside edges in the surrounding situations of the vehicle, based on the output information of the forward drive environment recognizer 24. Therefore, for example, when a forward blind spot is present at the intersection with poor visibility, the vehicle is driven forward by repeating the slow driving and the temporary stop while checking the safety of the surroundings, thus the safety check can be made accurately. Since the surrounding situation is continuously checked even during the slow driving, when a moving object is detected, brake control can be performed immediately anytime. Thus, it is possible to contribute to reduction in the occurrence of encounter traffic accident.

As in another example illustrated in FIG. 6 and FIG. 7, at the intersection 41 with good visibility, after the vehicle is temporarily stopped by temporary stop control processing using the normal vehicle drive control, the surrounding situation of the vehicle is checked based on the output information of the forward drive environment recognizer 24 which is a forward recognizer, and the vehicle is slowly driven while checking that the surrounding situation is safe for driving the vehicle. During this period, also at the second checkpoint B and the third checkpoint C (see FIG. 7), safety check of the surrounding situation is continuously made while slowly driving the vehicle.

Thus, consequently, when red light indication of the traffic signal 41aa ahead changes to green light indication at the intersection 41 with good visibility, the driving assistance device 1 of the embodiment recognizes the surrounding situation of the vehicle M1 without starting to drive the vehicle M1 immediately, and after checking the safety of the surrounding situation, starts to drive the vehicle M1. For example, when a crossing pedestrian is identified on the crosswalk 41c immediately in front of the vehicle M1, the surrounding situation is continuously checked while maintaining a temporarily stop state, and after a moving object is no longer detected and the safety of the surroundings is checked, the vehicle M1 is caused to start driving. In this case, when passing through the third checkpoint C, the vehicle also drives slowly with a reduced speed, thus safe driving and immediate stop upon detection of a moving object can be made.

Furthermore, in a situation where the situation forward of the road 102a on which the vehicle M1 drives is such that regardless of change the traffic signal to a green light, the vehicle M1 cannot be started immediately due to, for example, traffic jam, (for example, when space for the vehicle M1 is not present forward of the road 102a, and there is a possibility that the vehicle M1 remains in the intersection 41 or on the crosswalk 41c forward of the vehicle M1), even with a green light, the surrounding situation is continuously recognized without causing the vehicle M1 to enter the intersection 41, and the vehicle M1 is maintained at a temporary stop state at the position (the first checkpoint A) before the stop line 41b until space for the vehicle M1 to enter is found in the range away from the intersection 41. Therefore, even at the intersection 41 with good visibility, the vehicle is slowly driven while checking the safety of the surroundings, and the vehicle can be driven to pass through the intersection 41 while making the safety check accurately. During slow driving, the surrounding situation is continuously checked, thus when a moving object is detected, brake control can be performed immediately anytime. Thus, the occurrence of encounter traffic accident can be reduced.

In this manner, a series of driving operations performed by the driver of a vehicle are implemented by vehicle control in the art, thus the vehicle control can be implemented as not only control equivalent to partially automated driving (level 2), but also as control of completely automated driving (level 5).

Note that the driving assistance device may include the determiner that, in a stop state of the vehicle at a position before the stop line, upon checking that the forward situation allows the vehicle to drive safely, performs drive control to slowly drive the vehicle to a position before a road edge, when the vehicle is a vicinity of a position before the road edge, upon checking again that the forward situation allows the vehicle to drive safely, performs drive control to slowly drive the vehicle from the road edge by a predetermined distance, further performs slow drive control until the vehicle reaches a position forward of the road edge and allowing the driver of the vehicle to sufficiently check the safety of the crossroad crossing the road on which the vehicle is driving, and when the vehicle is in a vicinity of a position which allows the driver of the vehicle to sufficiently check the safety of the crossroad, checks that the forward situation allows the vehicle to drive safely.

A driving assistance method may include: performing brake control to stop the vehicle at a position before a stop line; in a stop state of the vehicle at the position before the stop line, upon checking that the situation allows the vehicle to drive safely, performing drive control to slowly drive the vehicle to a position before a road edge at which a road crosses a road on which the vehicle is driving, and performing brake control to stop the vehicle at the position before the road edge; and when the vehicle is in a stop state at the position before the road edge, upon checking again that the situation allows the vehicle to drive safely, performing slow drive control to drive the vehicle slowly to position which is forward of the position before the road edge position by a predetermined distance and allows the driver of the vehicle to sufficiently check the safety of the crossroad crossing the road on which the vehicle is driving, and performing brake control to stop the vehicle at the position which allows the driver of the vehicle to sufficiently check the safety of the crossroad; and when the vehicle is in a stop state at the position which allows the driver of the vehicle to sufficiently check the safety of the crossroad, upon checking again that the situation allows the vehicle to drive safely, performing drive control to drive the vehicle slowly.

The disclosure is not limited to the embodiment described above, and needless to say, various modifications and applications may be made without departing from the spirit of the disclosure. In addition, the embodiment includes novel ideas in various stages, and various novel ideas may be derived by an appropriate combination of disclosed multiple claim components. For example, when the problems described in DETAILED DESCRIPTION can be coped with, and the effect of the disclosure can be obtained with some claim components deleted from all the claim components illustrated in the embodiment, the configuration with some claim components deleted can be derived as an embodiment of the disclosure. In addition, the components in different embodiments may be combined appropriately. The disclosure is limited by the accompanying claims, however, is not limited by specific embodiments.

According to the disclosure, it is possible to provide a driving assistance device that contributes to reduction in the occurrence of so-called encounter traffic accident by a devised method of vehicle drive control after temporary stop of a vehicle before an intersection or in front of a stop line, for example.

The drive control unit 25 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive control unit 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the drive control unit 25 illustrated in FIG. 2.

The invention claimed is:

1. A driving assistance device configured to perform vehicle control to assist a driving operation of a vehicle, the driving assistance device comprising:
    a forward recognizer configured to perform recognition of at least a forward situation that is a situation forward of the vehicle in a traveling direction of the vehicle, the recognition of the forward situation including recognizing a stop line;
    a brake controller configured to perform brake control of the vehicle to stop the vehicle at a first position before a stop line provided on a road surface in response to the forward recognizer recognizing the stop line; and
    a determiner configured to determine execution of the brake control and drive control of the vehicle on a basis of one or both of first target data and second target data, the first target data being obtained by the forward recognizer, the second target data being related to the forward situation of the vehicle and obtained from map information, wherein
    the determiner is further configured to:
        determine to perform the drive control to slowly drive the vehicle from the first position toward a second position before a road edge at which a first road crosses a second road on which the vehicle is driving, in a case where, when the vehicle stops at the first position before the stop line, the forward situation is determined, on a basis of the result of the recognition of the forward situation by the forward recognizer, to allow the vehicle to drive safely; and
        determine to perform the drive control to slowly drive the vehicle forward from the second position before the road edge by a predetermined distance, in a case where, when the vehicle is in the second position before the road edge, the forward situation is determined again, on a basis of the result of the recognition of the forward situation by the forward recognizer, to allow the vehicle to drive safely.

2. A driving assistance device configured to perform vehicle control to assist a driving operation of a vehicle, the driving assistance device comprising:
    a forward recognizer configured to perform recognition of at least a forward situation that is a situation forward of the vehicle in a traveling direction of the vehicle;
    a brake controller configured to perform brake control of the vehicle to stop the vehicle at a first position before a stop line provided on a road surface on a basis of a result of the recognition of the forward situation by the forward recognizer; and
    a determiner configured to determine execution of the brake control and drive control of the vehicle on a basis of one or both of first target data and second target data, the first target data being obtained by the forward recognizer, the second target data being related to the forward situation of the vehicle and obtained from map information,
    wherein the determiner is configured to:
        determine to perform the drive control to slowly drive the vehicle from the first position toward a second position before a road edge at which a first road crosses a second road on which the vehicle is driving, in a case where, when the vehicle stops at the first position before the stop line, the forward situation is determined, on a basis of the result of the recognition of the forward situation by the forward recognizer, to allow the vehicle to drive safely; and determine to perform the drive control to slowly drive the vehicle forward from the second position before the road edge by a predetermined distance, in a case where, when the vehicle is in the second position before the road edge, the forward situation is determined again, on a basis of the result of the recognition of the forward situation by the forward recognizer, to allow the vehicle to drive safely, and wherein the determiner is configured to determine to perform the brake control by the brake controller, in a case where, while the vehicle is slowly driving from the first position before the stop line to a predetermined position through of the second position before the road edge, the predetermined position being away from of the second position before the road edge by the predetermined distance, the forward situation is determined, on a basis of the result of the recognition of the forward situation by the forward recognizer, not to allow the vehicle to drive safely.

3. The driving assistance device according to claim 1, further comprising a notifier configured to notify a driver who drives the vehicle of the forward situation of the vehicle recognized by the forward recognizer, wherein the determiner is configured to control the notifier to output a predetermined notification in a case where the forward situation is determined, on a basis of the result of the recognition of the forward situation by the forward recognizer, not to allow the vehicle to drive safely.

4. The driving assistance device according to claim 2, further comprising a notifier configured to notify a driver who drives the vehicle of the forward situation of the vehicle recognized by the forward recognizer, wherein the determiner is configured to control the notifier to output a predetermined notification in the case where the forward situation is determined, on a basis of the result of the recognition of the forward situation by the forward recognizer, not to allow the vehicle to drive safely.

5. A driving assistance device configured to perform vehicle control to assist a driving operation of a vehicle, the driving assistance device comprising:

a forward recognizer configured to perform recognition of at least a forward situation that is a situation forward of the vehicle in a traveling direction of the vehicle;

a brake controller configured to perform brake control of the vehicle to stop the vehicle at a first position before a stop line provided on a road surface on a basis of a result of the recognition of the forward situation by the forward recognizer; and a determiner configured to determine execution of the brake control and drive control of the vehicle on a basis of one or both of first target data and second target data, the first target data being obtained by the forward recognizer, the second target data being related to the forward situation of the vehicle and obtained from map information, wherein the determiner is further configured to:

determine to perform the drive control to slowly drive the vehicle from the first position toward a second position before a road edge at which a first road crosses a second road on which the vehicle is driving, in a case where, when the vehicle stops at the first position before the stop line, the forward situation is determined, on a basis of the result of the recognition of the forward situation by the forward recognizer, to allow the vehicle to drive safely; and determine to perform the drive control to slowly drive the vehicle forward from the second position before the road edge by a predetermined distance, in a case where, when the vehicle is in the second position before the road edge, the forward situation is determined again, on a basis of the result of the recognition of the forward situation by the forward recognizer, to allow the vehicle to drive safely, and wherein the determiner is further configured to in a case where, when the vehicle is in a stop state o at the first position before the stop line, the forward situation is determined, on a basis of the result of the recognition of the forward situation by the forward recognizer, to allow the vehicle to drive safely, determine to perform the drive control to slowly drive the vehicle to the second position before the road edge, and determine to perform the brake control to stop the vehicle at the second position before the road edge, and in a case where, when the vehicle is in a stop state at the second position before the road edge, the forward situation is determined again, on a basis of the result of the recognition of the forward situation by the forward recognizer, to allow the vehicle to drive safely, determine to perform the drive control to slowly drive the vehicle from the second position before the road edge by the predetermined distance, and determine to perform the brake control to stop the vehicle at a predetermined position away from the second position before the road edge by the predetermined distance.

6. The driving assistance device according to claim 2, wherein the determiner is configured to in a case where, when the vehicle is in a stop state o at the first position before the stop line, the forward situation is determined, on a basis of the result of the recognition of the forward situation by the forward recognizer, to allow the vehicle to drive safely, determine to perform the drive control to slowly drive the vehicle to the second position before the road edge, and determine to perform the brake control to stop the vehicle at the second position before the road edge, and in a case where, when the vehicle is in a stop state at the second position before the road edge, the forward situation is determined again, on a basis of the result of the recognition of the forward situation by the forward recognizer, to allow the vehicle to drive safely, determine to perform the drive control to slowly drive the vehicle from the second position before the road edge by the predetermined distance, and determine to perform the brake control to stop the vehicle at a predetermined position away from the second position before the road edge by the predetermined distance.

7. The driving assistance device according to claim 3, wherein the determiner is configured to in a case where, when the vehicle is in a stop state o at the first position before the stop line, the forward situation is determined, on a basis of the result of the recognition of the forward situation by the forward recognizer, to allow the vehicle to drive safely, determine to perform the drive control to slowly drive the vehicle to the second position before the road edge, and determine to perform the brake control to stop the vehicle at the second position before the road edge, and in a case where, when the vehicle is in a stop state at the second position before the road edge, the forward situation is determined again, on a basis of the result of the recognition of the forward situation by the forward recognizer, to allow the vehicle to drive safely, determine to perform the drive control to slowly drive the vehicle from the second position before the road edge by the predetermined distance, and determine to perform the brake control to stop the vehicle at a predetermined position away from the second position before the road edge by the predetermined distance.

8. The driving assistance device according to claim 4, wherein the determiner is configured to in a case where, when the vehicle is in a stop state o at the first position before the stop line, the forward situation is determined, on a basis of the result of the recognition of the forward situation by the forward recognizer, to allow the vehicle to drive safely, determine to perform the drive control to slowly drive the vehicle to the second position before the road edge, and determine to perform the brake control to stop the vehicle at the second position before the road edge, and in a case where, when the vehicle is in a stop state at the second position before the road edge, the forward situation is determined again, on a basis of the result of the recognition of the forward situation by the forward recognizer, to allow the vehicle to drive safely, determine to perform the drive control to slowly drive the vehicle from the second position before the road edge by the predetermined distance, and determine to perform the brake control to stop the vehicle at a predetermined position away from the second position before the road edge by the predetermined distance.

9. The driving assistance device according to claim 5, wherein the determiner is configured to in a case where, when the vehicle is in the stop state at the first position before the stop line, obtain first outline information on an object by performing object detection on a basis of the first target data, during at least a period until the vehicle achieves the stop state at the second position before the road edge, perform the object detection again on a basis of the first target data, and obtain second outline information on the object, and repeatedly performing processing to determine whether the object is a moving object at predetermined time intervals by comparing the first outline information detected at a previous time of the object detection with the second outline information detected at a current time of the object detection.

10. The driving assistance device according to claim 6, wherein the determiner is configured to in a case where, when the vehicle is in the stop state at the first position before the stop line, obtain first outline information on an object by performing object detection on a basis of the first target data, during at least a period until the vehicle achieves the stop state at the second position before the road edge, perform the object detection again on a basis of the first target data, and obtain second outline information on the object, and repeatedly performing processing to determine whether the object is a moving object at predetermined time intervals by comparing the first outline information detected at a previous time of the object detection with the second outline information detected at a current time of the object detection.

11. The driving assistance device according to claim 7, wherein the determiner is configured to in a case where, when the vehicle is in the stop state at the first position before the stop line, obtain first outline information on an object by performing object detection on a basis of the first target data, during at least a period until the vehicle achieves the stop state at the second position before the road edge, perform the object detection again on a basis of the first target data, and obtain second outline information on the object, and repeatedly performing processing to determine whether the object is a moving object at predetermined time intervals by comparing the first outline information detected at a previous time of the object detection with the second outline information detected at a current time of the object detection.

12. The driving assistance device according to claim 8, wherein the determiner is configured to in a case where, when the vehicle is in the stop state at the first position before the stop line, obtain first outline information on an object by performing object detection on a basis of the first target data, during at least a period until the vehicle achieves the stop state at the second position before the road edge, perform the object detection again on a basis of the first target data, and obtain second outline information on the object, and repeatedly performing processing to determine whether the object is a moving object at predetermined time intervals by comparing the first outline information detected at a previous time of the object detection with the second outline information detected at a current time of the object detection.

13. A driving assistance device configured to perform vehicle control to assist a driving operation of a vehicle by vehicle control, the driving assistance device comprising circuitry configured to:

perform recognition of at least a forward situation that is a situation forward of the vehicle in a traveling direction of the vehicle, the recognition of the forward situation including recognizing a stop line;

perform brake control of the vehicle to stop the vehicle at a first position before a stop line provided on a road surface in response in response to recognizing that the stop line is recognized; and determine execution of the brake control and drive control of the vehicle on a basis of one or both of first target data and second target data, the first target data being obtained by the circuitry, the second target data being related to the forward situation of the vehicle and obtained from map information, wherein the circuitry is further configured to:

determine to perform the drive control to slowly drive the vehicle from the first position toward a second position before a road edge at which a first road crosses a second road on which the vehicle is driving, in a case where, when the vehicle stops at the first position before the stop line, the forward situation is determined, on a basis of the result of the recognition of the forward situation, to allow the vehicle to drive safely; and determine to perform the drive control to slowly drive the vehicle forward from the second position before the road edge by a predetermined distance, in a case where, when the vehicle is in the vicinity of the second position before the road edge, the forward situation is determined again, on a basis of the result of the recognition of the forward situation, to allow the vehicle to drive safely.

* * * * *